(12) United States Patent
Nishio et al.

(10) Patent No.: US 12,475,928 B2
(45) Date of Patent: Nov. 18, 2025

(54) VIDEO CREATION METHOD

(71) Applicant: FUJIFILM Corporation, Tokyo (JP)

(72) Inventors: Yuya Nishio, Saitama (JP); Tomoyuki Kawai, Saitama (JP); Koichi Tanaka, Saitama (JP); Junya Kitagawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 56 days.

(21) Appl. No.: 18/049,634

(22) Filed: Oct. 26, 2022

(65) Prior Publication Data

US 2023/0061593 A1 Mar. 2, 2023

Related U.S. Application Data

(63) Continuation of application No. PCT/JP2021/014628, filed on Apr. 6, 2021.

(30) Foreign Application Priority Data

May 28, 2020 (JP) ................................. 2020-093180

(51) Int. Cl.
*G11B 27/02* (2006.01)
*H04N 5/77* (2006.01)
(Continued)

(52) U.S. Cl.
CPC ............... *G11B 27/02* (2013.01); *H04N 5/77* (2013.01); *H04N 5/917* (2013.01);
(Continued)

(58) Field of Classification Search
CPC ............ H04N 5/77; H04N 7/18; H04N 25/44; H04N 5/917; H04N 25/42; H04N 23/695;
(Continued)

(56) References Cited

U.S. PATENT DOCUMENTS 8,953,091 B2 * 2/2015 Hamada ............... H04N 25/704
348/349
9,237,319 B2 * 1/2016 Sawadaishi .......... H04N 25/704
(Continued)

FOREIGN PATENT DOCUMENTS

| CN | 105308648 | 2/2016 |
|----|-----------|--------|
| CN | 105993164 | 10/2016 |

(Continued)

OTHER PUBLICATIONS

Office Action of Japan Counterpart Application, with English translation thereof, issued on Nov. 21, 2023, pp. 1-11.
(Continued)

*Primary Examiner* — Thai Q Tran
*Assistant Examiner* — Nienru Yang
(74) *Attorney, Agent, or Firm* — JCIPRNET

(57) ABSTRACT

A video creation method includes a first recording step of reading out the pixel signals from the plurality of pixels, creating a video of a first angle of view at a first thinning-out rate, and recording first video data, and a second recording step of, in a case where a target subject exists in the first angle of view, creating a video of a second angle of view including the target subject and having a second angle of view smaller than the first angle of view at a second thinning-out rate lower than the first thinning-out rate, and recording second video data.

20 Claims, 13 Drawing Sheets

(51) Int. Cl.
  *H04N 5/917* (2006.01)
  *H04N 23/63* (2023.01)
  *H04N 23/67* (2023.01)
  *H04N 23/695* (2023.01)
(52) U.S. Cl.
  CPC ......... *H04N 23/635* (2023.01); *H04N 23/672* (2023.01); *H04N 23/695* (2023.01)
(58) Field of Classification Search
  CPC .... H04N 23/61; H04N 23/635; H04N 23/672; G11B 27/02
  USPC .......................................................... 386/280
  See application file for complete search history.

(56) References Cited

U.S. PATENT DOCUMENTS

| | | | |
|---|---|---|---|
| 9,635,246 B2 | 4/2017 | Shroff et al. | |
| 9,848,116 B2 | 12/2017 | Shimokawa et al. | |
| 10,310,213 B2 | 6/2019 | Hongu | |
| 2004/0141067 A1 | 7/2004 | Nakayama et al. | |
| 2005/0122407 A1 | 6/2005 | Kawai | |
| 2009/0160947 A1 | 6/2009 | Shigeta et al. | |
| 2010/0231713 A1 | 9/2010 | Oyabu et al. | |
| 2011/0050963 A1 | 3/2011 | Watabe | |
| 2016/0182832 A1* | 6/2016 | Koishi | G02B 7/28 348/241 |
| 2018/0288308 A1* | 10/2018 | Furumochi | H04N 23/683 |
| 2019/0253655 A1* | 8/2019 | Tsuchiya | H04N 25/50 |
| 2019/0273889 A1* | 9/2019 | Aihara | G02B 13/00 |

FOREIGN PATENT DOCUMENTS

| | | |
|---|---|---|
| JP | 2002369183 | 12/2002 |
| JP | 2004180240 | 6/2004 |
| JP | 2005175719 | 6/2005 |
| JP | 2006042399 | 2/2006 |
| JP | 2008178059 | 7/2008 |
| JP | 2009171545 | 7/2009 |
| JP | 2015108672 | 6/2015 |
| JP | 6254114 | 12/2017 |
| JP | 2018036509 | 3/2018 |
| WO | 2007114327 | 10/2007 |
| WO | 2009141951 | 11/2009 |

OTHER PUBLICATIONS

"International Search Report (Form PCT/ISA/210) of PCT/JP2021/014628," mailed on Jul. 13, 2021, with English translation thereof, pp. 1-5.

"Written Opinion of the International Searching Authority (Form PCT/ISA/237)" of PCT/JP2021/014628, mailed on Jul. 13, 2021, with English translation thereof, pp. 1-10.

"Office Action of Japan Counterpart Application", issued on Mar. 26, 2024, with English translation thereof, p. 1-p. 9.

"Office Action of Japan Counterpart Application", issued on Jul. 23, 2024, with English translation thereof, p. 1-p. 6.

"Office Action of China Counterpart Application", issued on Oct. 15, 2024, with English translation thereof, p. 1-p. 19.

* cited by examiner

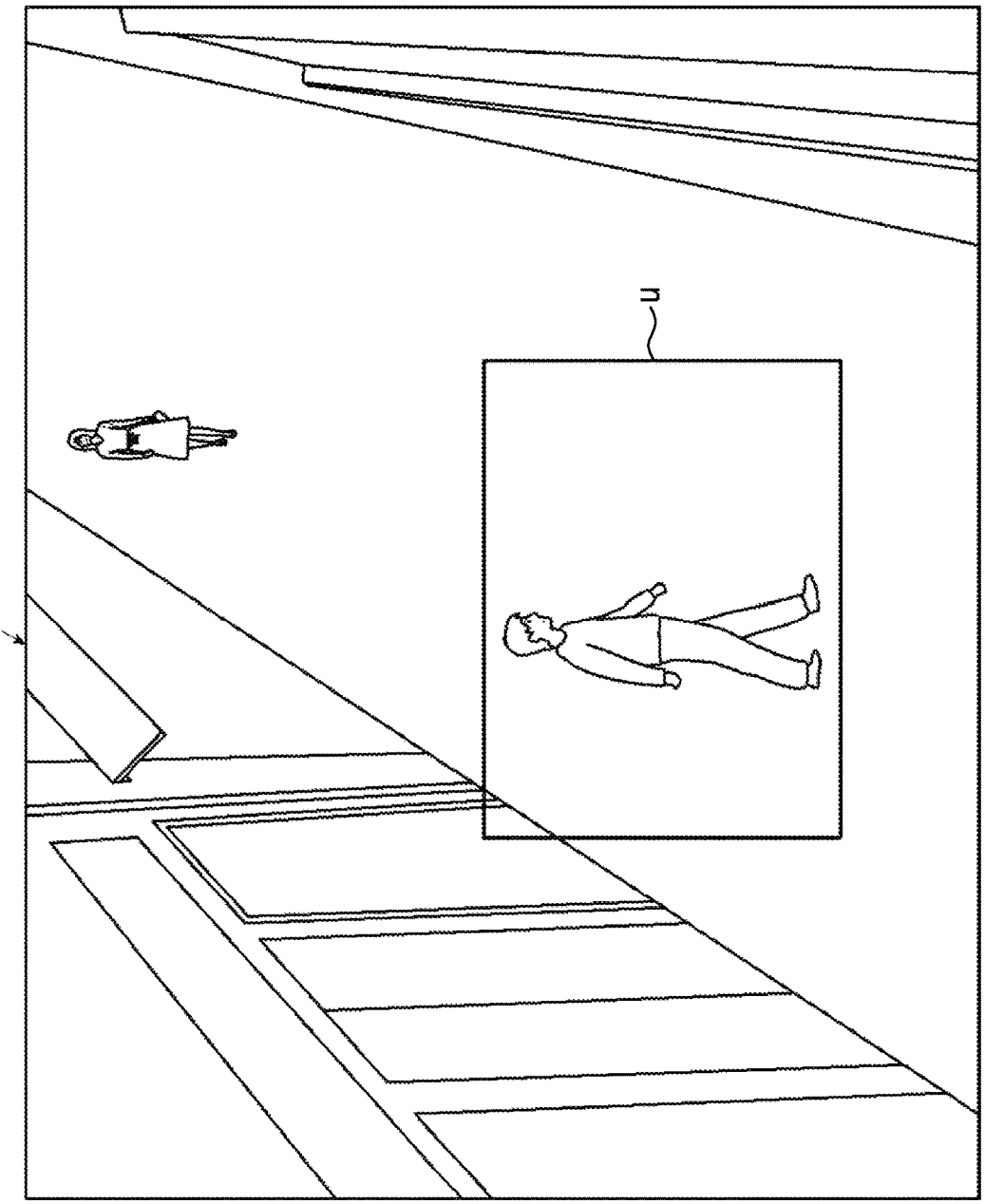

VIDEO CREATION METHOD

CROSS-REFERENCE TO RELATED APPLICATIONS

This application is a Continuation of PCT International Application No. PCT/JP2021/014628 filed on Apr. 6, 2021, which claims priority under 35 U.S.C § 119(a) to Japanese Patent Application No. 2020-093180 filed on May 28, 2020. Each of the above application(s) is hereby expressly incorporated by reference, in its entirety, into the present application.

BACKGROUND OF THE INVENTION

1. Field of the Invention

The present invention relates to a video creation method, and more particularly, to a video creation method of performing thinning-out processing on a video.

2. Description of the Related Art

In a case where all pixel signals output from a plurality of pixels are read out to record video data, a data volume increases, and thus thinning-out processing may be performed on a video.

On the other hand, for example, a video of a subject of interest may be required to be recorded with higher definition. In the technique described in JP2005-175719A or JP6254114B, a higher resolution video is captured in a case where a motion of an object within an imaging range (that is, angle of view) is detected, and a lower resolution video is captured in a case where the motion thereof is not detected.

SUMMARY OF THE INVENTION

However, in the technique described in JP2005-175719A or JP6254114B, in a case where there is a moving subject, a video of the entire imaging range including objects other than the subject is captured at high resolution, and thus a volume of video data increases.

The present invention has been made in view of the above circumstances, and an object of the present invention is to solve the problems in the related art described above and to provide a video creation method in which image quality of a video of a target subject can be ensured while reducing a volume of video data.

In order to achieve the above object, a video creation method according to an aspect of the present invention is used in an imaging device that reads out pixel signals from a plurality of pixels in an imaging element to create any video data using the pixel signals and comprises a first recording step of reading out the pixel signals from the plurality of pixels, creating a video of a first angle of view at a first thinning-out rate, and recording first video data, and a second recording step of, in a case where a target subject exists within the first angle of view, creating a video including the target subject and having a second angle of view smaller than the first angle of view at a second thinning-out rate lower than the first thinning-out rate and recording second video data.

Further, a third recording step of recording data of information for associating the second video data with the first video data in a case where the second recording step is performed may be provided.

Further, in the imaging element, the plurality of pixels may be arranged in a first arrangement direction and a second arrangement direction intersecting with each other, a plurality of pixel rows may be arranged in the first arrangement direction, and the pixel signals may be read out in units of the pixel row. In this case, a video is configured of a plurality of pixel videos arranged in a first direction corresponding to the first arrangement direction and a second direction corresponding to the second arrangement direction. In this case, it is preferable that the second thinning-out rate in the first direction is smaller than the first thinning-out rate in the first direction.

Some of the pixels outputting the pixel signals used in the first recording step may be pixels common to some of the pixels outputting the pixel signals used in the second recording step.

Further, it is preferable that imaging by the imaging element is repeatedly performed for each unit imaging period, and the first recording step and the second recording step are performed by using the pixel signals output from pixels in the same unit imaging period.

Further, in a case where a plurality of target subjects exist within the first angle of view, the second recording step may be performed on the plurality of target subjects.

Further, imaging by the imaging element may be repeatedly performed for each unit imaging period, and the first recording step and the second recording step may be performed in the unit imaging periods different from each other. In this case, an adjustment step of outputting signals from a plurality of phase difference pixels included in the plurality of pixels and adjusting a focal position during imaging, in the unit imaging period in which one recording step of the first recording step and the second recording step is performed, may be provided. In the adjustment step, the focal position may be adjusted based on phase difference information according to the signals output from the plurality of phase difference pixels.

Furthermore, the plurality of phase difference pixels may include a plurality of first phase difference pixels that output signals in the unit imaging period in which the first recording step is performed and a plurality of second phase difference pixels that output signals in the unit imaging period in which the second recording step is performed. In this case, in the adjustment step, it is preferable that the focal position is adjusted based on the phase difference information according to the signals output from the plurality of first phase difference pixels and the phase difference information according to the signals output from the plurality of second phase difference pixels.

Further, in a case where the target subject exists within the first angle of view and a size of the target subject is larger than a reference size, the second recording step may be performed.

Alternatively, in a case where the target subject exists within the first angle of view and a size of the target subject is smaller than a reference size, the second recording step may be performed.

Further, the second recording step may end at a point in time at which a defined time elapses from a start of the second recording step.

Further, in a case where a target subject within the first angle of view moves out of the first angle of view during the second recording step, a housing that accommodates the imaging element may be moved to fit the target subject within the first angle of view again.

Further, in a case where the second recording step is performed, the first video data in which identifier display data is incorporated may be recorded in the first recording step. In this case, it is preferable that the identifier display data is data for displaying, on the video of the first angle of view, an identifier representing a position of the video of the second angle of view in which the second video data is recorded.

Further, the number of pixels outputting the pixel signals used for video creation may decrease as the thinning-out rate is higher.

BRIEF DESCRIPTION OF THE DRAWINGS

FIG. 12 is a diagram showing the video of the first angle of view displayed by reproducing first video data and an identifier displayed on the video of the first angle of view in a superimposed manner.

DESCRIPTION OF THE PREFERRED EMBODIMENTS

A preferred embodiment of the present invention (hereinafter referred to as the present embodiment) will be described in detail with reference to the accompanying drawings.

Figure 1:
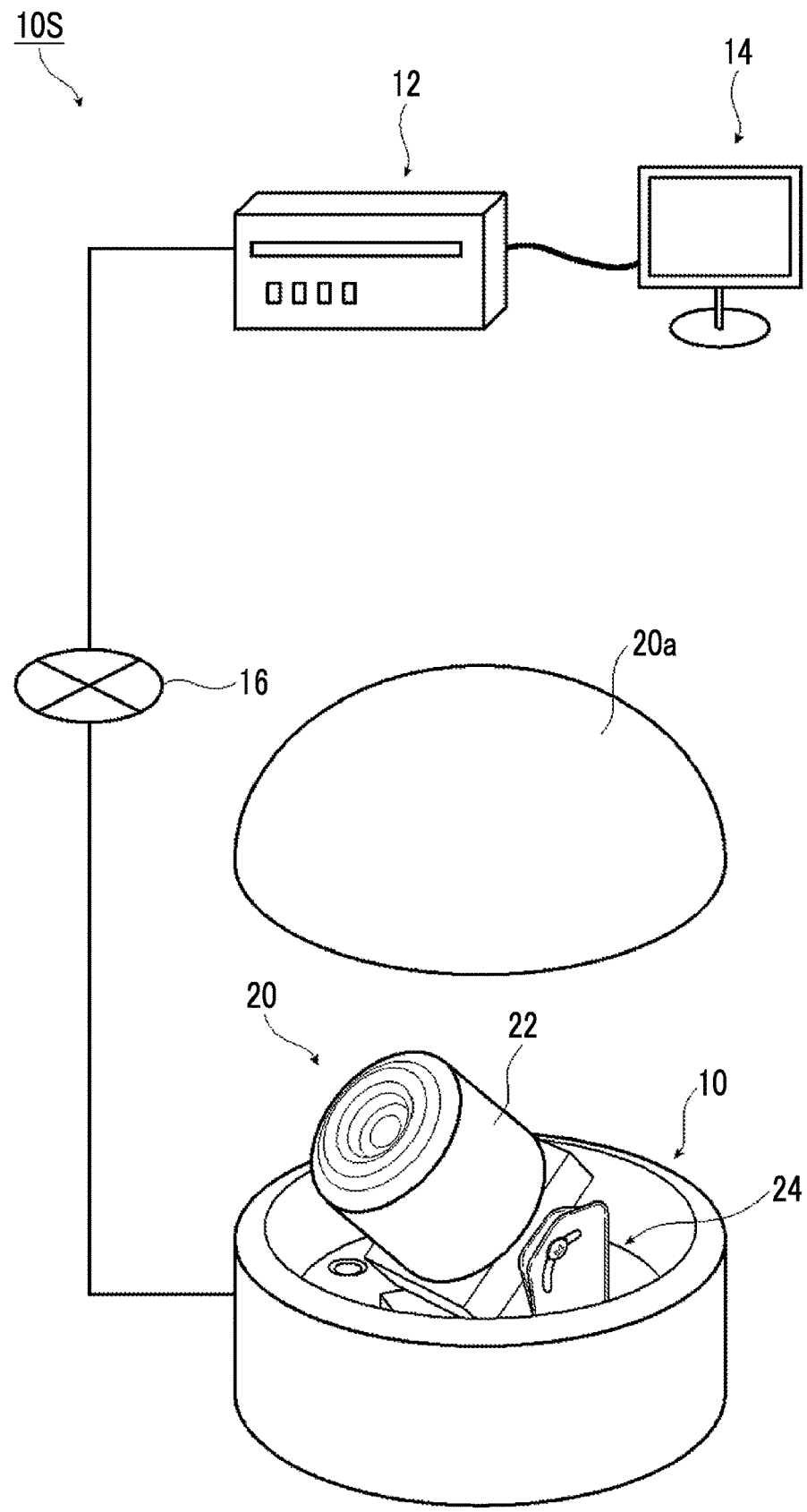
FIG. 1 is a diagram showing an example of an imaging device and a related apparatus according to an embodiment of the present invention.
Figure 2:
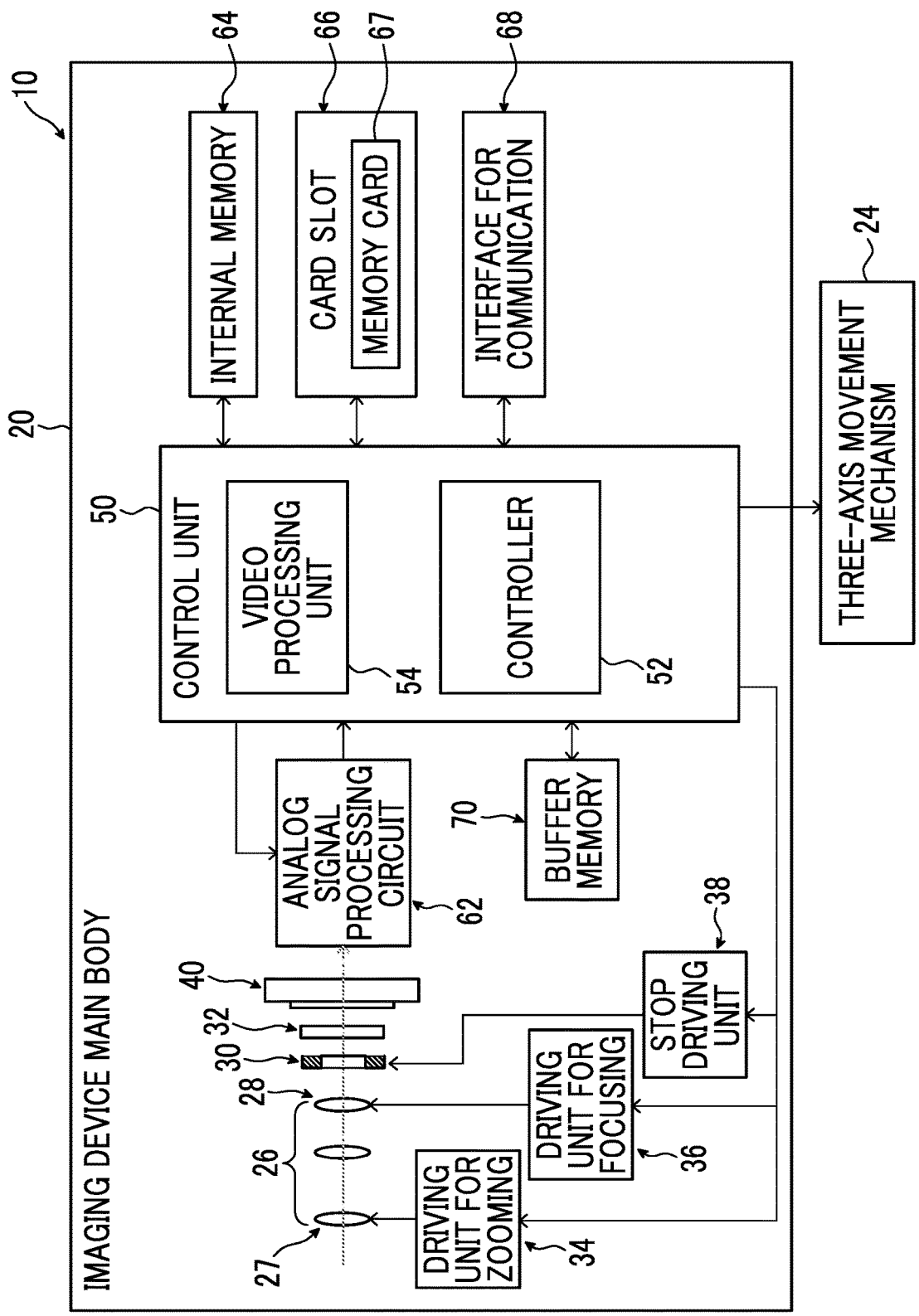
FIG. 2 is a block diagram showing a configuration of the imaging device according to an embodiment of the present invention.

The present embodiment relates to a video creation method using an imaging device 10 shown in FIGS. 1 and 2. The embodiment described below is merely an example given to facilitate understanding of the present invention and does not limit the present invention. The present invention may be changed or modified from the embodiment described below without departing from the gist thereof. The present invention also includes equivalents thereof.

In the present specification, "perpendicular" includes not only being strictly perpendicular but also a case where an angle formed by two directions differs from 90 degrees by several degrees. Further, "parallel" includes not only being strictly parallel but also a case where one of two directions is inclined from a state of being parallel by several degrees with respect to the other.

In the present specification, "simultaneously" includes a range recognized as "simultaneously" in the technical field to which the present invention belongs, and some delay (error) is permissible. For example, a plurality of pieces of processing performed within one unit imaging period, which will be described below, are assumed to be performed "simultaneously" even in a case where execution timings of the pieces of processing are slightly different.

[About Imaging Device]

An imaging device of the present embodiment (hereinafter referred to as imaging device 10) is, for example, a surveillance camera and captures (images) a video of a predetermined range at an installed place. The "video" is mainly a moving image, and the imaging device 10 captures the video at a predetermined frame rate to create any video data. That is, the imaging device 10 corresponds to a video creation device.

Here, "create any video" is to construct a video (original video) shown in an imaging range as it is or to perform processing such as thinning-out processing described below on the original video to construct a video, by using a pixel signal read out from a pixel p of an imaging element 40 shown in FIG. 4 described below.

The imaging device 10 is connected to a monitoring terminal 12 via a network 16 as shown in FIG. 1 and constitutes an imaging system 10S together with the monitoring terminal 12. Data of the video (hereinafter referred to as video data) created by the imaging device 10 is transmitted to the monitoring terminal 12 via the network 16. Accordingly, the video created by the imaging device 10 is displayed on a monitor 14 on a monitoring terminal 12 side (refer to FIG. 12, for example).

In a case where a target subject is detected within an angle of view (strictly speaking, first angle of view described below) that is an imaging range, the imaging device 10 creates a video of an angle of view (strictly speaking, second angle of view described below) including the target subject, records the video data thereof, and transmits the video data to the monitoring terminal 12.

Here, the "target subject" is a subject, among subjects other than a landscape, that satisfies a certain condition such as being in motion and corresponds to, for example, a passerby, an animal, or a vehicle reflected in the angle of view. The target subject may be limited to a certain target subject. For example, only a person reflected in the angle of view for a predetermined time or more may be set as the target subject. Alternatively, all persons reflected in the angle of view of the imaging device 10 may be set as target subjects without setting a limitation on the target subject.

A configuration of the imaging device 10 is generally the same as that of a general surveillance camera, and includes an imaging device main body 20, a housing 22, and a three-axis movement mechanism 24, as shown in FIG. 1. The imaging device main body 20 is accommodated in a housing 22 and covered with a dome-shaped main body cover 20a having light transmittance. The three-axis movement mechanism 24 moves the housing 22 in each direction of three mutually perpendicular axes (roll, pitch, and yaw) to change the angle of view of the imaging device 10. As for configurations of the housing 22 and the three-axis movement mechanism 24, a known configuration used for the surveillance camera can be used, and thus description thereof is omitted.

The imaging device main body 20 has, for example, an optical unit 26 consisting of a plurality of lenses and a stop 30, as shown in FIG. 2. The optical unit 26 includes an optical apparatus 27 for zooming such as a zoom lens. The optical apparatus 27 is moved in an optical axis direction by a driving unit 34 for zooming to change the zoom of the angle of view. The imaging device 10 may comprise an electronic zoom function in addition to an optical zoom function.

The optical unit 26 includes an optical apparatus 28 for focusing such as a focus lens. The optical apparatus 28 is moved in the optical axis direction to adjust a focal position during imaging. The imaging device 10 of the present embodiment controls a driving unit 36 for focusing based on phase difference information, by an image plane phase difference autofocus method, to adjust the focal position to be focused on a predetermined position in the angle of view. The autofocus method is not limited to the image plane phase difference type, and may be a contrast type or a phase difference type other than the image plane phase difference type.

The optical unit 26 may include a wide-angle lens, an ultra-wide-angle lens, a 360-degree lens, an anamorphic lens, or the like. In this case, the imaging can be performed with a wide angle of view in a horizontal direction. The imaging device 10 may comprise a single optical unit 26 or may comprise a plurality of optical units 26 with different angles of view.

An opening shape of the stop 30 is adjusted by a stop driving unit 38. Accordingly, an amount of exposure in the imaging element 40 is adjusted.

The imaging device main body 20 comprises a shutter 32, the imaging element 40, a control unit 50, an analog signal processing circuit 62, an internal memory 64, a card slot 66, an interface 68 for communication, and a buffer memory 70, as shown in FIG. 2.

The imaging element 40 is an image sensor configured of a solid-state imaging element such as a charged coupled device (CCD) or a complementary metal oxide semiconductor (CMOS). The imaging element 40 performs the imaging, receives light that has passed through the optical unit 26, the stop 30, and the like to form an image, converts the optical image into the pixel signal that is an electrical signal, and outputs the converted signal. The imaging by the imaging element 40 is repeated for a length of a predetermined unit imaging time.

The control unit 50 controls each unit of the imaging device 10 to execute processing related to video creation, recording, and the like. The control unit 50 includes a controller 52 and a video processing unit 54 as shown in FIG. 2.

The control unit 50 is configured of one or more processors. The processor may be configured of, for example, a central processing unit (CPU), a field programmable gate array (FPGA), a digital signal processor (DSP), an application specific integrated circuit (ASIC), a graphics processing unit (GPU), a micro-processing unit (MPU), or another integrated circuit (IC) or large-scale integrated circuit (LSI). Alternatively, the processor may be configured by combining the above. In the processor, functions of the entire control unit 50 including the controller 52 and the video processing unit 54 may be configured by one integrated circuit (IC) chip, as represented by a system on chip (SoC) or the like. A hardware configuration of each processor described above may be realized by an electric circuit (circuitry) in which circuit elements such as semiconductor elements are combined.

The controller 52 controls the imaging element 40 and the analog signal processing circuit 62 such that a video with a length of a predetermined unit imaging time is created, for example. Further, the controller 52 controls the driving units 34, 36, and 38, the imaging element 40, the analog signal processing circuit 62, and the like in order to adjust an imaging condition.

Furthermore, the controller 52 controls the three-axis movement mechanism 24 to move the housing 22 that accommodates each unit of the imaging device main body 20 including the imaging element 40 and the like. Accordingly, in a case where the target subject within the angle of view moves out of the angle of view during the imaging, it is possible to change the angle of view such that the target subject is tracked.

Figure 3:
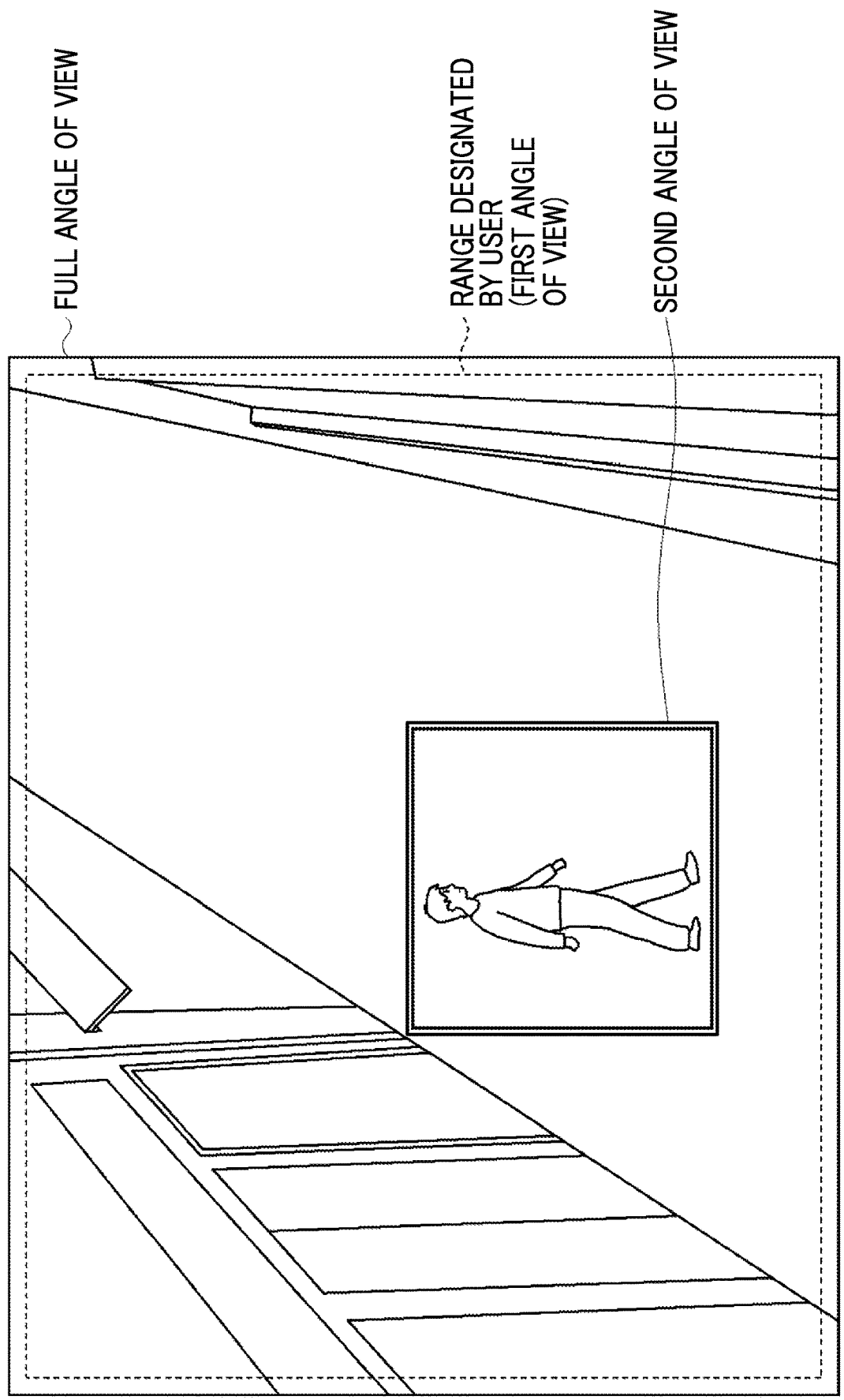
FIG. 3 is an explanatory diagram of a first angle of view and a second angle of view.

Under the control of the controller 52, the video processing unit 54 creates a video of the first angle of view and records first video data. The first angle of view is an angle of view set with reference to a full angle of view of the imaging device 10 as shown in FIG. 3 and is, for example, a range designated by a user within the full angle of view (for example, range indicated by broken line in FIG. 3). The first video data is data in which the video of the first angle of view is recorded.

The first angle of view can be designated as a predetermined size and be the full angle of view at maximum. The designation of the first angle of view is performed, for example, based on an operation on an operation panel (not shown) provided on the imaging device 10 or an input operation on the monitoring terminal 12 side. The first angle of view is usually rectangular, but the shape is not particularly limited, and may be circular, elliptical, quadrangular other than rectangular, or another polygonal.

The video of the first angle of view may be displayed as a through image on the monitor 14 of the monitoring terminal 12 at any time.

The video processing unit 54 performs gamma correction, white balance correction, and the like on the pixel signal converted into digital data by the analog signal processing circuit 62 to generate a video signal. The video signal after the processing is compressed in a compression format conforming to a predetermined standard to become compressed digital video data. The compressed digital video data is repeatedly generated for a length of a predetermined unit imaging period.

The video processing unit 54 analyzes the video of the first angle of view to determine the presence or absence of the target subject (for example, passerby) within the first angle of view. An algorithm for detecting the target subject within the first angle of view is not particularly limited, but known template matching can be used as an example. That is, an image of the target subject is stored as a template image, and the presence or absence of the target subject can be determined by comparison and collation with the template image in the video of the first angle of view.

In a case where the target subject is detected within the first angle of view, the video processing unit 54 creates a video of the second angle of view including the target subject and records second video data together with the first video data. The second angle of view is an angle of view that includes the target subject, is smaller than the first angle of view, and is located within the first angle of view (fits within first angle of view). The second video data is data in which the video of the second angle of view, that is, the video of the target subject is recorded.

A size of the second angle of view is automatically set by the video processing unit 54 according to a size of the detected target subject. Although the second angle of view is usually rectangular, a shape thereof is not particularly limited, and may be circular, elliptical, quadrangular other than rectangular, or another polygonal.

The first video data and the second video data are recorded in the internal memory 64 or the like and transmitted to the monitoring terminal 12 at any time. Each piece of video data is recorded according to a predetermined recording format (moving image format). The recording format of each piece of video data is not particularly limited and may be freely determined. Each piece of video data may be recorded only in a recording medium of the monitoring terminal 12 without being stored in a recording medium of the imaging device 10 or conversely, may be recorded only in the recording medium of the imaging device 10.

Hereinafter, unless otherwise specified, the operations and processing of the controller 52 and the video processing unit 54 will be described as the operations and processing of the control unit 50.

The internal memory 64 built in the imaging device main body 20 and a memory card 67 detachable from the card slot 66 are recording media for recording the video data generated by the control unit 50.

The interface 68 for communication constitutes an input/output port for data transmission/reception between the imaging device 10 and the monitoring terminal 12.

The buffer memory 70 functions as a work memory for the control unit 50.

[About Imaging Element]

Figure 4:
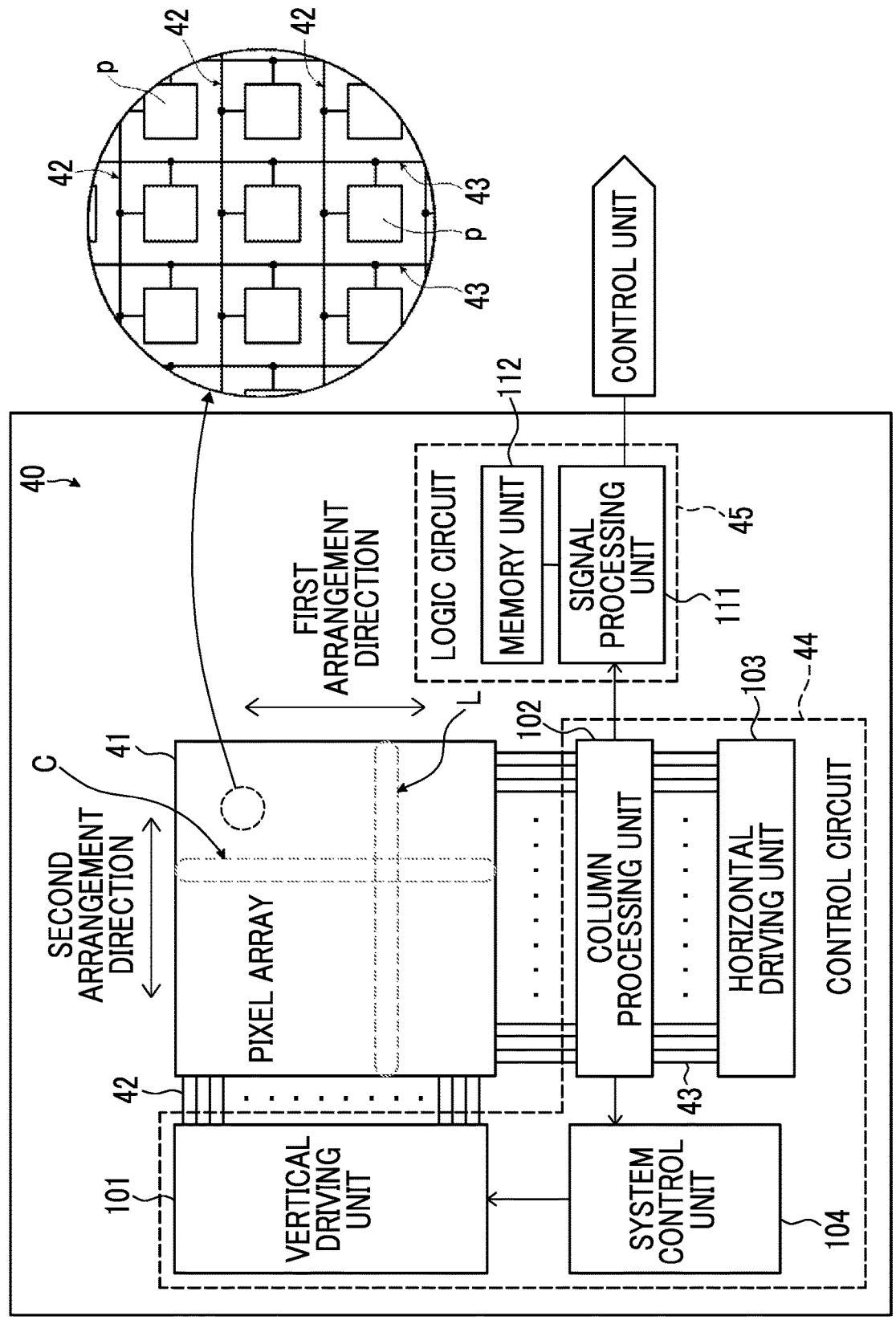
FIG. 4 is a diagram showing a configuration of an imaging element.

In description of the imaging element 40 again, the imaging element 40 has a pixel array 41, a pixel driving line 42, a vertical signal line 43, a control circuit 44, and a logic circuit 45, as shown in FIG. 4. These components are formed on a semiconductor substrate such as a silicon substrate (not shown).

Figure 5:
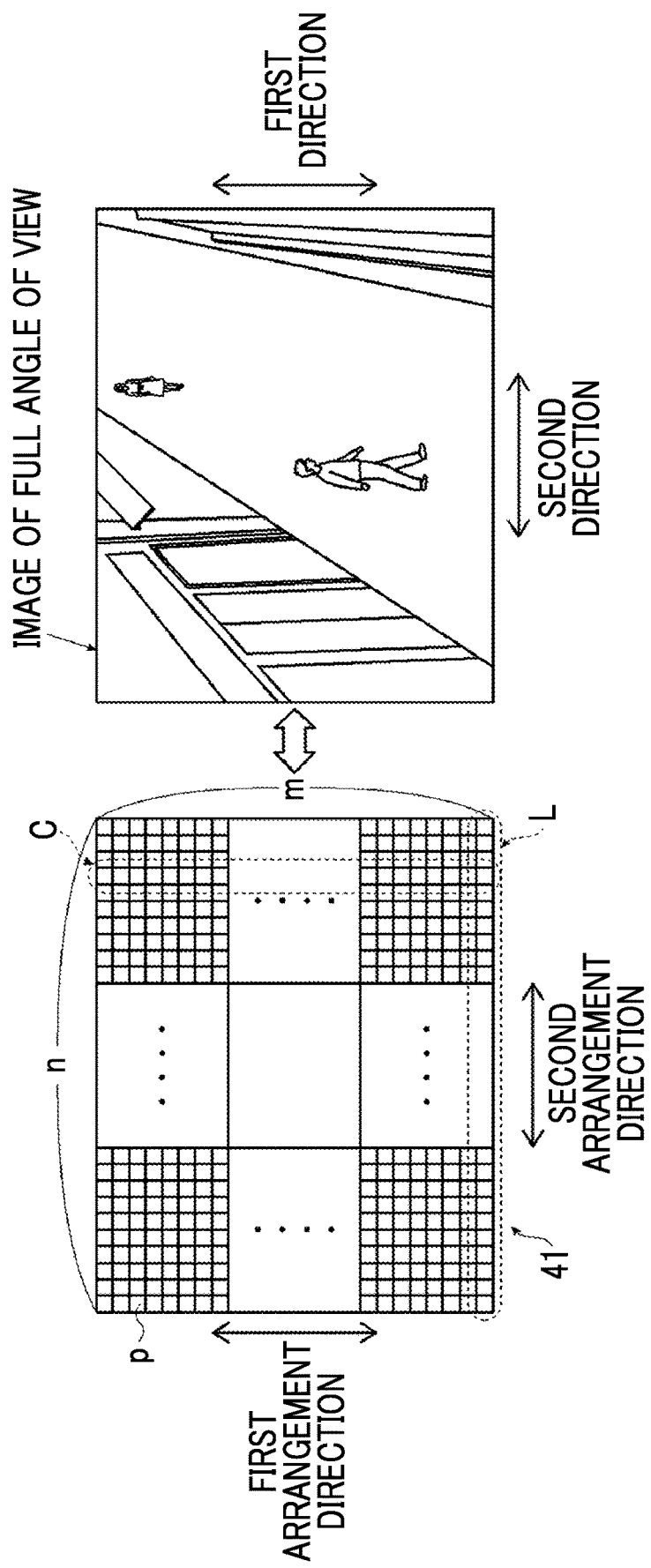
FIG. 5 is a diagram showing a correspondence relationship between pixels that output pixel signals used for video creation and a video to be created.

As shown in FIG. 5, the pixel array 41 consists of a plurality of pixels p that are two-dimensionally arranged side by side in two arrangement directions intersecting each other in the imaging element 40. In each pixel p, a photoelectric conversion element generates an electric charge of light according to an amount of light received by exposure. The electric charge is accumulated in the pixel p and then output as the pixel signal. In the present embodiment, each pixel p corresponds to any one of three colors red (R), green (G), and blue (B).

In the pixel array 41, a plurality of pixel rows L are arranged in a first arrangement direction, and a plurality of pixel columns C are arranged in a second arrangement direction, as shown in FIG. 5. The first arrangement direction is a transmission direction of the pixel signal and usually corresponds to a vertical direction. The second arrangement direction is perpendicular to the first arrangement direction and usually corresponds to the horizontal direction. In the present embodiment, the pixel array 41 has m pixel rows L arranged in the first arrangement direction and n pixel columns C arranged in the second arrangement direction. m and n are natural numbers of 2 or more, for example, several hundred to several thousand.

Figure 6:
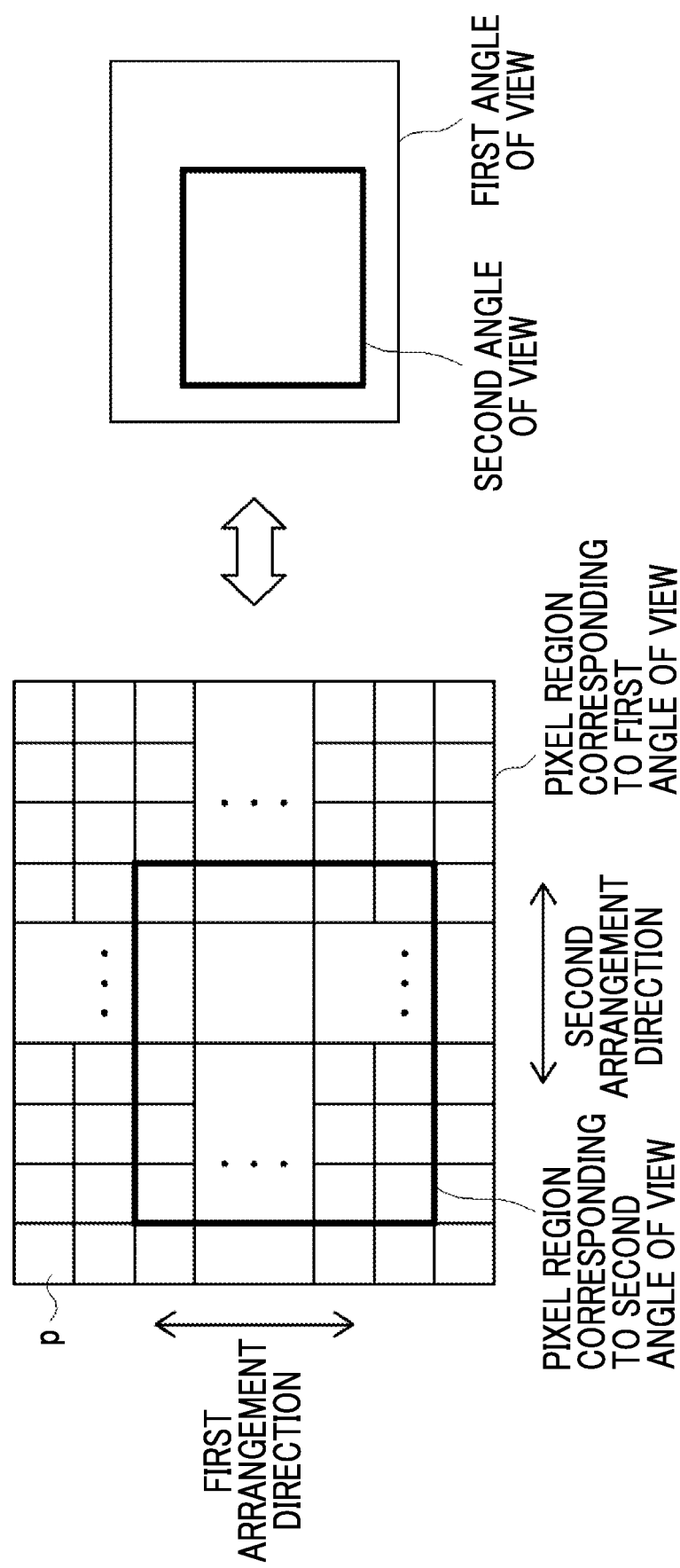
FIG. 6 is a diagram showing a correspondence relationship between each of the first angle of view and the second angle of view and pixels in the imaging element.

In the following description, a region in which the pixels p are arranged in the pixel array 41 is referred to as a pixel region.

m×n pixels p in the pixel array 41 correspond to a video of the full angle of view as shown in FIG. 5. In the pixel array 41, a pixel region at the same position as a positional relationship of the first angle of view with respect to the full angle of view is a pixel region corresponding to the first angle of view. Similarly, in the pixel array 41, a pixel region at the same position as a positional relationship of the second angle of view with respect to the full angle of view is a pixel region corresponding to the second angle of view. As shown in FIG. 6, the pixel region corresponding to the second angle of view is within the pixel region corresponding to the first angle of view and is smaller than the pixel region corresponding to the first angle of view.

The video of the first angle of view is created by the pixel signals output from the pixels p in the pixel region corresponding to the first angle of view. The video of the second angle of view is created from the pixel signals output from the pixels p in the pixel region corresponding to the second angle of view.

The pixel array 41 (that is, m×n pixels p) includes a plurality of phase difference pixels for phase difference detection. Phase difference information is specified by the pixel signal output from each phase difference pixel. The control unit 50 adjusts the focal position based on the specified phase difference information by the image plane phase difference method.

The pixel driving line 42 is provided for each pixel row L as shown in FIG. 4 and is wired to each of the n pixels p included in each pixel row L. The vertical signal line 43 is provided for each pixel column C as shown in FIG. 4 and is wired to each of the m pixels p included in each pixel column C.

The control circuit 44 controls readout of the pixel signal. The readout of the pixel signal is to transmit the pixel signal output from the pixel p to a predetermined transmission destination. In the present specification, the reading out of the pixel signal from the pixel p is also referred to as "reading out pixel p", and reading out the pixel signal from each pixel p in the pixel row L, which will be described below, is also referred to as "reading out pixel row L".

The control circuit 44 includes a vertical driving unit 101, a column processing unit 102, a horizontal driving unit 103, and a system control unit 104, as shown in FIG. 4. With the reading out of the pixel signal from the pixel p in units of the pixel row L by the vertical driving unit 101, a rolling shutter operation, which is an electronic shutter operation, is performed. However, the present invention is not limited thereto. With reading out of the pixel signals from all the pixels p at the same time, a global shutter operation as the electronic shutter operation may be performed.

As shown in FIG. 4, the vertical driving unit 101 comprises an output end for each pixel row L, and corresponding one end of the pixel driving line 42 is connected to each output end. Scanning by the vertical driving unit 101 includes a readout scanning system and a sweeping scanning system.

In the readout scanning system, the pixel rows L are sequentially selected from the top in the first arrangement direction, and a pulse signal for pixel driving is output from the output end corresponding to the pixel driving line 42 wired to the selected pixel row L. Accordingly, the pixel signals from the pixels p included in the pixel row L are sequentially read out in units of the pixel row L. A pixel signal output from each pixel p is supplied to the column processing unit 102 through the vertical signal line 43 to which each pixel p is wired.

The sweeping scanning system precedes the readout scanning system by a time of a shutter speed, and a pulse signal for resetting (reset signal) is output from the output end corresponding to the pixel driving line 42 wired to each pixel row L. With the scanning by the sweeping scanning system, it is possible to sweep unnecessary electric charges from photoelectric conversion elements of the pixels included in each pixel row L to reset the pixels p.

In the electronic shutter operation of the rolling shutter method, the reset of each pixel p, the exposure, and the electric charge accumulation are performed in order in units of the pixel row L, and a video for one unit imaging period is created for one shutter operation. Note that one unit imaging period corresponds to a time interval from in a case where the reset signal is output to one pixel p until in a case where the next reset signal is output.

The column processing unit 102 has a signal processing circuit for each pixel column C. The pixel signal output from each pixel p is input to the column processing unit 102 for each pixel column C through the vertical signal line 43 to which each pixel p is wired. Each signal processing circuit performs correlated double sampling (CDS) processing, noise removal processing, and the like on the pixel signal to be input for each pixel column C.

Instead of the analog signal processing circuit 62, the column processing unit 102 may include a signal processing circuit that performs A/D conversion processing of converting the pixel signal output from the pixel p from an analog signal to a digital signal and outputting the converted signal. The above-described CDS processing, noise removal processing, and the like may be performed after the A/D conversion.

The horizontal driving unit 103 is configured of a shift register, an address decoder, or the like, and selects each signal processing circuit of the column processing unit 102 in order and inputs the pixel signal processed by the selected signal processing circuit to the logic circuit 45.

The system control unit 104 is configured of a timing generator or the like that generates various timing signals, and controls the vertical driving unit 101, the column processing unit 102, and the horizontal driving unit 103 based on the generated timing signals.

The logic circuit 45 comprises a signal processing unit 111 and a memory unit 112, as shown in FIG. 4. The signal processing unit 111 performs various pieces of signal processing such as addition processing on the pixel signal output from the control circuit 44 and outputs the processed pixel signal to the control unit 50. The memory unit 112 temporarily stores the pixel signal after the processing or the pixel signal during the processing. The pixel signal stored in the memory unit 112 is referred to by the signal processing unit 111 at a necessary timing.

In the imaging element 40 configured as described above, for example, with the reading out of the pixel signals from all the pixels p (that is, m×n pixels p) in the pixel array 41, it is possible to create the video of the full angle of view.

With the selection of the pixel row L and the pixel column C to be read out, it is possible to create a partial video of the full angle of view, that is, the video of the first angle of view. That is, with the selection of the pixel row L and the pixel column C in the pixel region corresponding to the first angle of view and the reading out of the pixel signals from the pixels p included in each of the selected pixel row L and pixel column C, it is possible to create the video of the first angle of view. In a similar manner, with the selection of the pixel row L and the pixel column C in the pixel region corresponding to the second angle of view and the reading out of the pixel signals from the pixels p included in each of the selected pixel row L and pixel column C, it is possible to create the video of the second angle of view.

[About Thinning-Out Processing]

In the pixel array 41, with the reading out of the pixel signals from all the pixels p in the pixel region corresponding to the first angle of view or the second angle of view, it is possible to create an all-readout video as the video of the first angle of view or the second angle of view. For example, in a case where the first angle of view is the full angle of view, with the reading out of the pixel signals from all m×n pixels p, the all-readout video is created as the video of the first angle of view. Hereinafter, for convenience of description, the first angle of view or the second angle of view is also collectively referred to as "set angle of view" for convenience.

The all-readout video has a high resolution. However, on the other hand, a video data volume is large, and thus a data transmission time is long. On the contrary, the imaging device 10 comprises a function of performing the thinning-out processing for the purpose of reducing the video data volume and shortening the data transmission time.

The thinning-out processing is processing of thinning out the number of pixels p whose pixel signals are read out among the pixels p in a pixel region corresponding to the set angle of view in a case where the video of the set angle of view is created. A video generated by the thinning-out processing has a lower resolution than the all-readout video, but the video data volume can be reduced according to the number of thinned-out pixels. Therefore, it is possible to shorten the data transmission time.

Figure 7A:
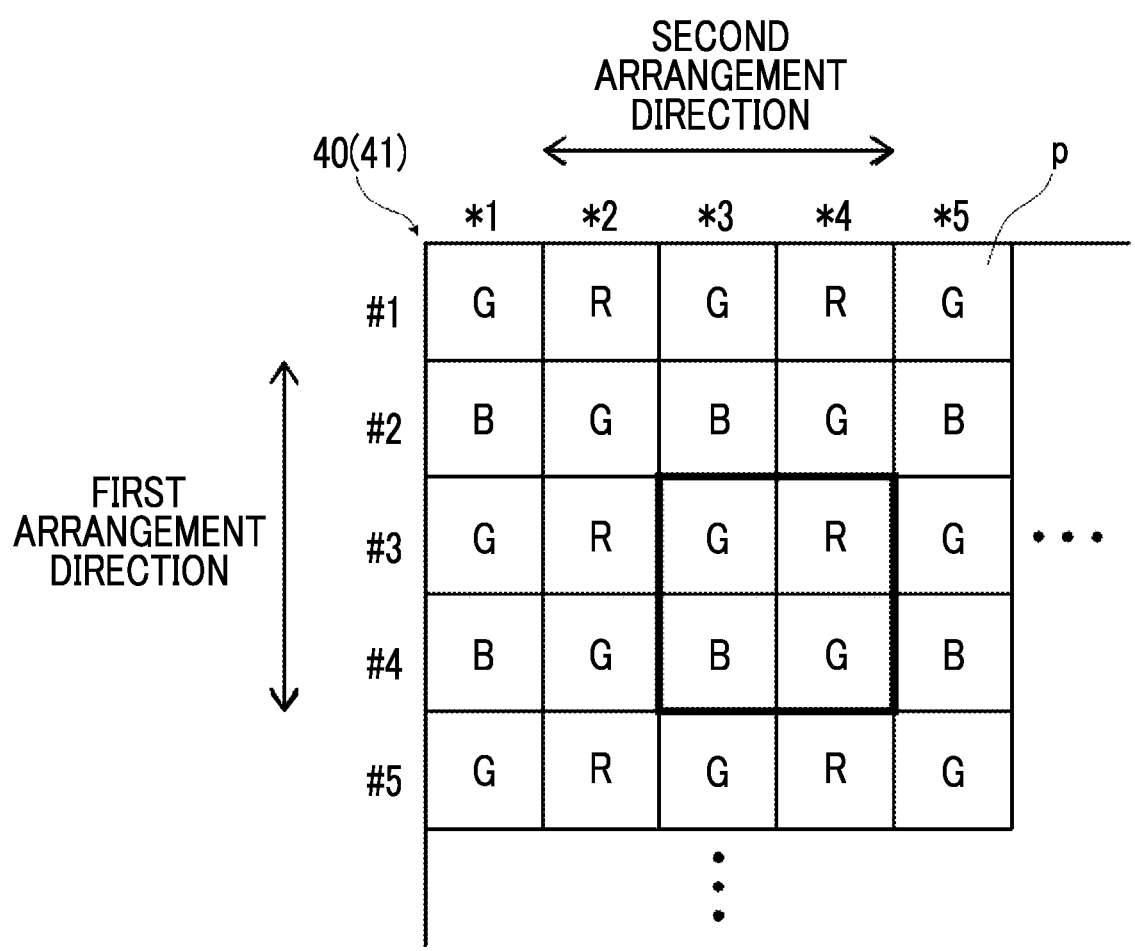
FIG. 7A is a diagram showing a Bayer array of pixels in the imaging element.
Figure 7B:
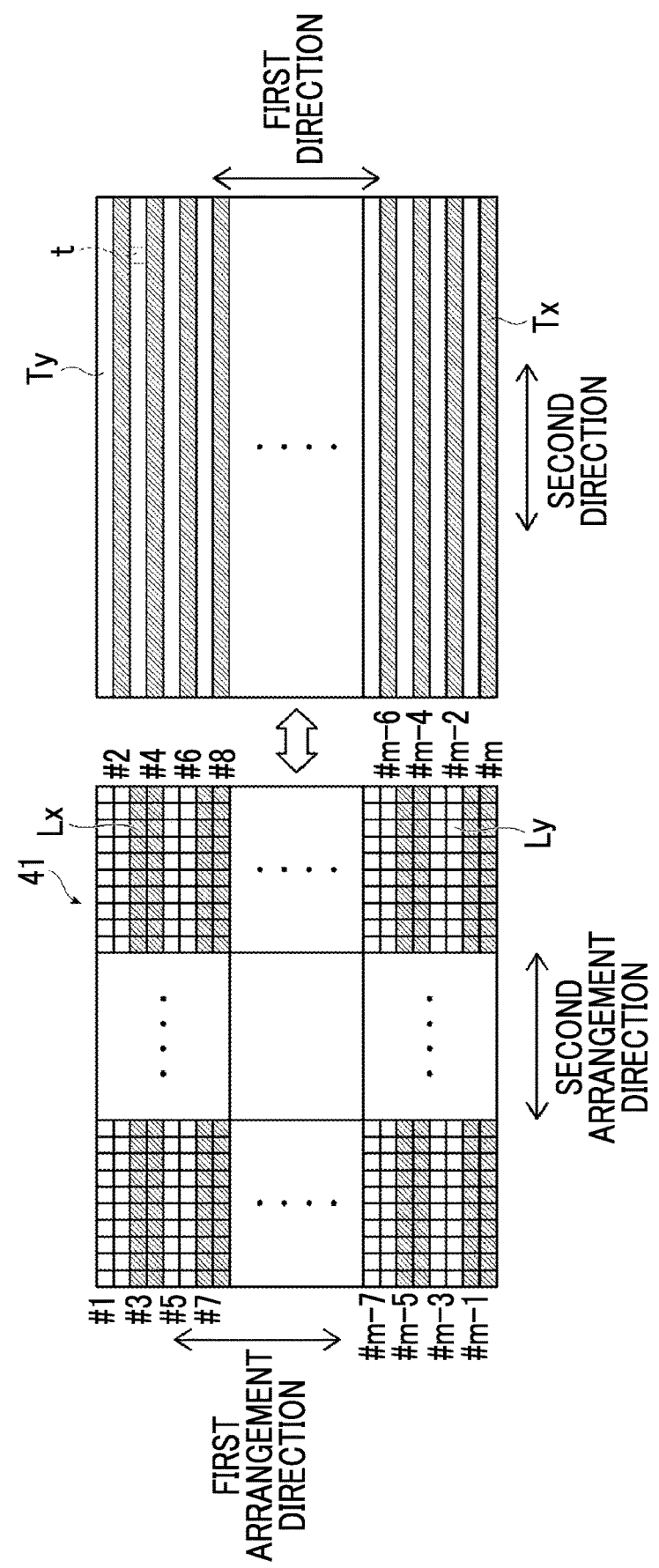
FIG. 7B is an explanatory diagram of thinning-out processing.

As an example of the thinning-out processing for the imaging element 40 in which the pixels p are arranged in a Bayer array, ½ thinning-out will be described with reference to FIGS. 7A and 7B. FIG. 7A is a diagram showing the Bayer array of the pixels p in the imaging element 40, and shows the pixels p arranged in a part of the imaging element 40. FIG. 7B is an explanatory diagram of the ½ thinning-out. A diagram on a left side of FIG. 7B shows the pixel p in the pixel region corresponding to a set region, and a diagram on a right side shows a portion to be thinned out and the other portion of the all-readout video of the set angle of view. The case shown in FIG. 7B is an example in which the ½ thinning-out is performed on the video of the set angle of view with the set angle of view as the full angle of view.

In describing the thinning-out, the Bayer array of the pixels p in the imaging element 40 will be explained with reference to FIG. 7A. In the imaging element 40, pixel groups each having 2×2 (that is, 4) pixels p as a unit are continuously disposed in the first arrangement direction and the second arrangement direction, and the pixels p of each color are arranged in the order of GRGB clockwise from an upper left pixel p in one pixel group.

In the ½ thinning-out, for example, in the pixel rows L arranged in the first arrangement direction in the pixel region corresponding to the set angle of view, the pixel rows L to be skipped and the pixel rows L not to be skipped are continued every two rows. That is, in a case where the ½ thinning-out is performed, a thinning-out pixel row Lx (two pixel rows in which hatched pixels are arranged in figure) and a non-thinning-out pixel row Ly (two pixel rows in which white pixels are arranged in figure) alternately exist in the first arrangement direction, as shown in FIG. 7B. Accordingly, a resolution of the video of the set angle of view is ½ of a resolution of the all-readout video. With such thinning-out, it is possible to read out the pixel signals of the pixels p of each color of RGB in the pixel region corresponding to the set angle of view while skipping a predetermined number of pixels p.

The resolution is the number of pixel videos t per unit area in the video of the set angle of view and is usually represented by pixel per inch (ppi). The pixel video t is a unit that constitutes the video of the set angle of view, and is one video fragment in a case where the video of the set angle of view is divided by the number of pixels p from which the pixel signals are read out in the pixel region corresponding to the set angle of view. In other words, the video of the set angle of view is constructed by a plurality of pixel videos t arranged in a first direction and a second direction that are perpendicular to each other. The first direction is a direction corresponding to the first arrangement direction and usually corresponds to a longitudinal direction of the video. The second direction is a direction corresponding to the second arrangement direction and usually corresponds to a lateral direction of the video. The pixel video t constitutes a recorded video and is a unit video based on the pixel signal.

In description of the ½ thinning-out again, a thinning-out rate for the video of the set angle of view is ½ in the ½ thinning-out. In other words, with the ½ thinning-out, it is possible to create the video of the set angle of view such that the thinning-out rate is ½. The thinning-out rate is a value calculated by the following equation (1).

$$\text{Thinning-out rate } (\%) = (1 - Na/Nb) \times 100 \quad (1)$$

Na in the above equation (1) indicates the number of pixel videos t in the video of the set angle of view, and Nb indicates the number of pixels in the pixel region corresponding to the set angle of view.

In the present embodiment, a ratio of the number of pixels p from which the pixel signals are read out to the number of pixels p in the pixel region corresponding to the set angle of view corresponds to the thinning-out rate. In other words, the number of pixels p that output the pixel signals used for video creation decreases as the thinning-out rate is higher.

In the present embodiment, the thinning-out is performed in units of the pixel row L as shown in FIG. 7. Therefore, the thinning-out rate is a thinning-out rate of the pixel row L in the first arrangement direction. From the viewpoint of the video of the set angle of view, a thinning-out video line group Tx at a position corresponding to the thinning-out pixel row Lx is thinned out in the all-readout video of the set angle of view, as shown in FIG. 7. In other words, only a non-thinning-out video line group Ty at a position corresponding to the non-thinning-out pixel row Ly constitutes the video of the set angle of view.

As described above, in the present embodiment, the thinning-out rate is a thinning-out rate in the first direction, more specifically, a thinning-out rate of a video line. The video line is a row consisting of the plurality of pixel videos t arranged in the second direction. In the ½ thinning-out, for example, the thinning-out video line group Tx and the non-thinning-out video line group Ty are alternately arranged in the first direction.

The thinning-out is not limited to the case of being performed in units of the pixel row L and may be performed in units of the pixel column C, for example. In this case, the thinning-out rate is a thinning-out rate in the second direction. The thinning-out may be performed in units of both the pixel row L and the pixel column C. In this case, the thinning-out rate is the product of the thinning-out rate in the first direction and the thinning-out rate in the second direction.

The thinning-out rate is set in advance in a case where the thinning-out processing is performed. In the thinning-out processing, the number of pixel rows L corresponding to the set thinning-out rate is thinned out as the thinning-out pixel rows Lx. For example, in a case where g pixel rows L (g is natural number of 3 or more) that are continuous in the first arrangement direction are set as one unit, the thinning-out rate in a case where the thinning-out pixel row Lx is set to h thinning-out pixel rows Lx (h is natural number smaller than g) in each unit is $(1-h/g) \times 100$.

The thinning-out rate may be set to 0. In this case, the all-readout video is created as the video of the set angle of view.

As described above, in the present embodiment, the thinning-out processing is performed in a mode that reduces the number of pixels p from which the pixel signals are read out in the imaging element 40. Accordingly, a transmission amount of the pixel signal from the imaging element 40 to the control unit 50 is reduced.

The mode of the thinning-out processing may be a mode other than the above mode. For example, a case is considered in which the pixel signals are read out from all the pixels p in the pixel region corresponding to the set angle of view and temporarily stored in the memory unit 112 of the imaging element 40. In this case, the thinning-out processing is performed in which the signal processing unit 111 thins out signals of the number of pixels corresponding to the thinning-out rate among the stored pixel signals, and only remaining pixel signals are transmitted to the control unit 50.

The pixel signals may be read out from all the pixels p in the pixel region corresponding to the set angle of view, and the pixel signals for all pixels may be transmitted to the control unit 50. In this case, the control unit 50 thins out the signals of the number of pixels corresponding to the thinning-out rate among the transmitted pixel signals.

An example of another piece of thinning-out processing includes reading out the pixel signals from a plurality of pixels p of the same color in the first arrangement direction or the second arrangement direction and performing arithmetic mean processing on the pixel signals from each pixel p. With the averaging of the pixel signals from each pixel p in this manner, the number of pixel signals transmitted to the control unit 50 is reduced as compared with the number of pixel signals before the averaging. As the thinning-out technique by the arithmetic mean processing of the pixel signals, a technique described in JP2015-27045A and a technique described in JP2013-30939A can be used.

For a method of the thinning-out processing, a method other than the above may be employed as long as the number of pixel signals used for video creation can be reduced by thinning-out in the method.

In the present embodiment, the imaging device 10 records the first video data indicating the video of the first angle of view created at a first thinning-out rate with the thinning-out rate in a case where the video of the first angle of view is created as the first thinning-out rate. In a case where the target subject is detected within the first angle of view, the imaging device 10 records the first video data and creates the video of the second angle of view at a second thinning-out rate to record the second video data.

In the present embodiment, the second thinning-out rate is smaller than the first thinning-out rate. In the present embodiment, the first thinning-out rate and the second thinning-out rate are each defined as the thinning-out rate in the first direction of the video. In other words, the thinning-out rate is a ratio of a value obtained by squaring the number of the thinning-out video line groups Tx to the number of all video lines. That is, the second thinning-out rate in the first direction is smaller than the first thinning-out rate in the first direction.

Figure 8A:
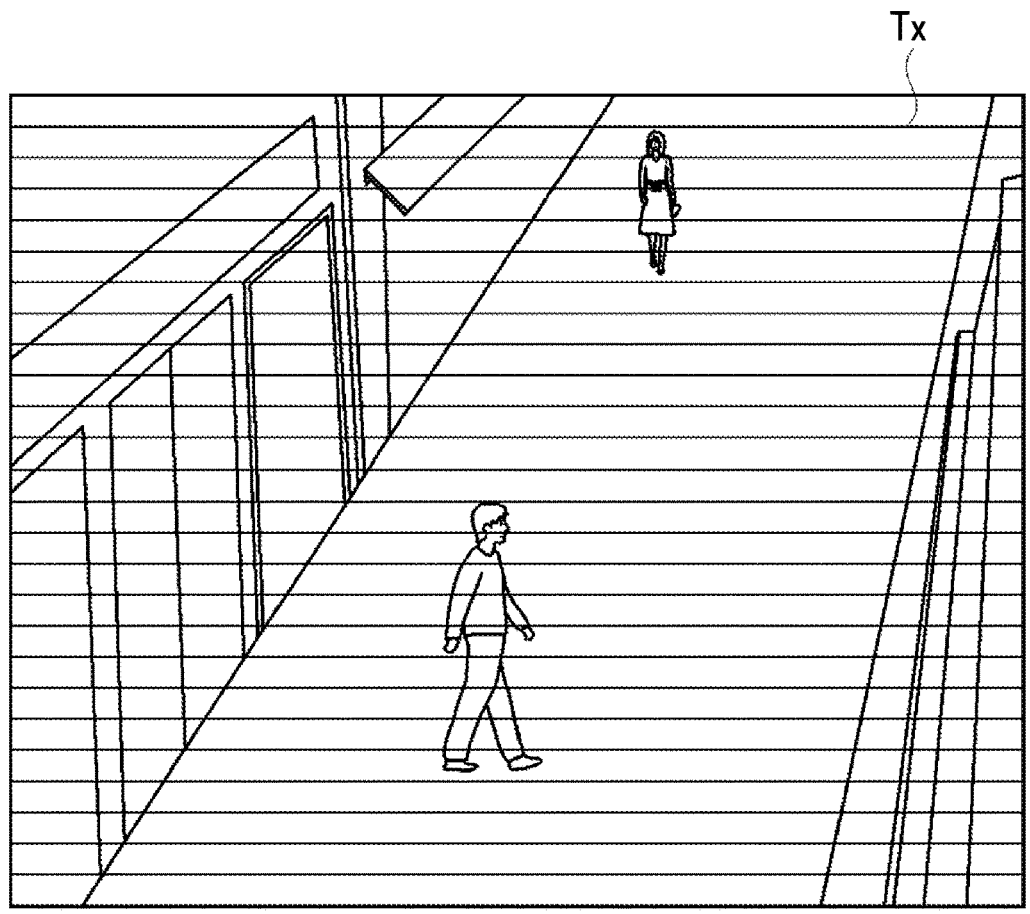
FIG. 8A is an explanatory diagram of a video of the first angle of view.
Figure 8B:
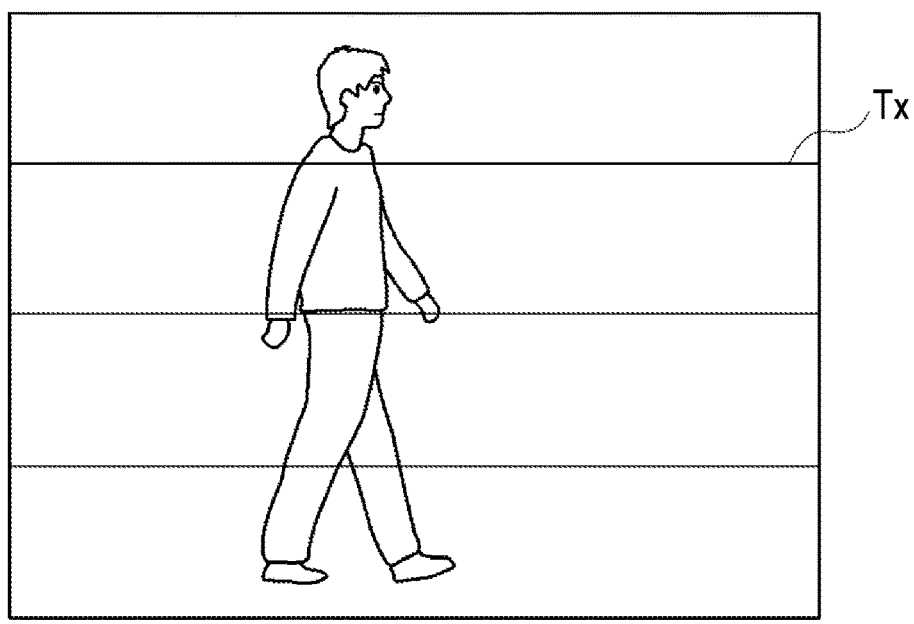
FIG. 8B is an explanatory diagram of a video of the second angle of view.

As described above, in the present embodiment, the video of the first angle of view is a lower resolution video as shown in FIG. 8A, and the video of the second angle of view is a higher resolution video as shown in FIG. 8B. Accordingly, it is possible to reduce the data volume and shorten the data transmission time for a video of a wider first angle of view. On the other hand, the image quality is ensured as a higher resolution video for a video of narrower second angle of view since the video is the video of the target subject.

FIG. 8A shows the video of the first angle of view, and FIG. 8B shows the video of the second angle of view. FIGS. 8A and 8B are based on the all-readout video for the reason of indicating a position of the thinning-out video line group Tx (displayed by black line in figures). In addition, a video actually displayed is a video obtained by thinning out the thinning-out video line group Tx from the all-readout video shown in FIGS. 8A and 8B.

In the present embodiment, as described above, the thinning-out rate is defined in the first direction of the video. In other words, the pixel p is skipped in units of the pixel row L in the first arrangement direction (vertical direction) in the pixel array 41. With the thinning-out in units of the pixel row L in this manner, it is possible to speed up the readout of the pixel signal in the pixel array 41 and reduce the volume of video data to be recorded. As a specific example of the thinning-out rate, for example, the thinning-out rate for the video of the first angle of view shown in FIG. 8A is 50%, and the thinning-out rate of the video of the second angle of view shown in FIG. 8B is 20%.

[Video Creation Flow]

A procedure of a processing flow (hereinafter referred to as video creation flow) relating to video creation and video data recording by the imaging device 10 will be described.

Figure 9:
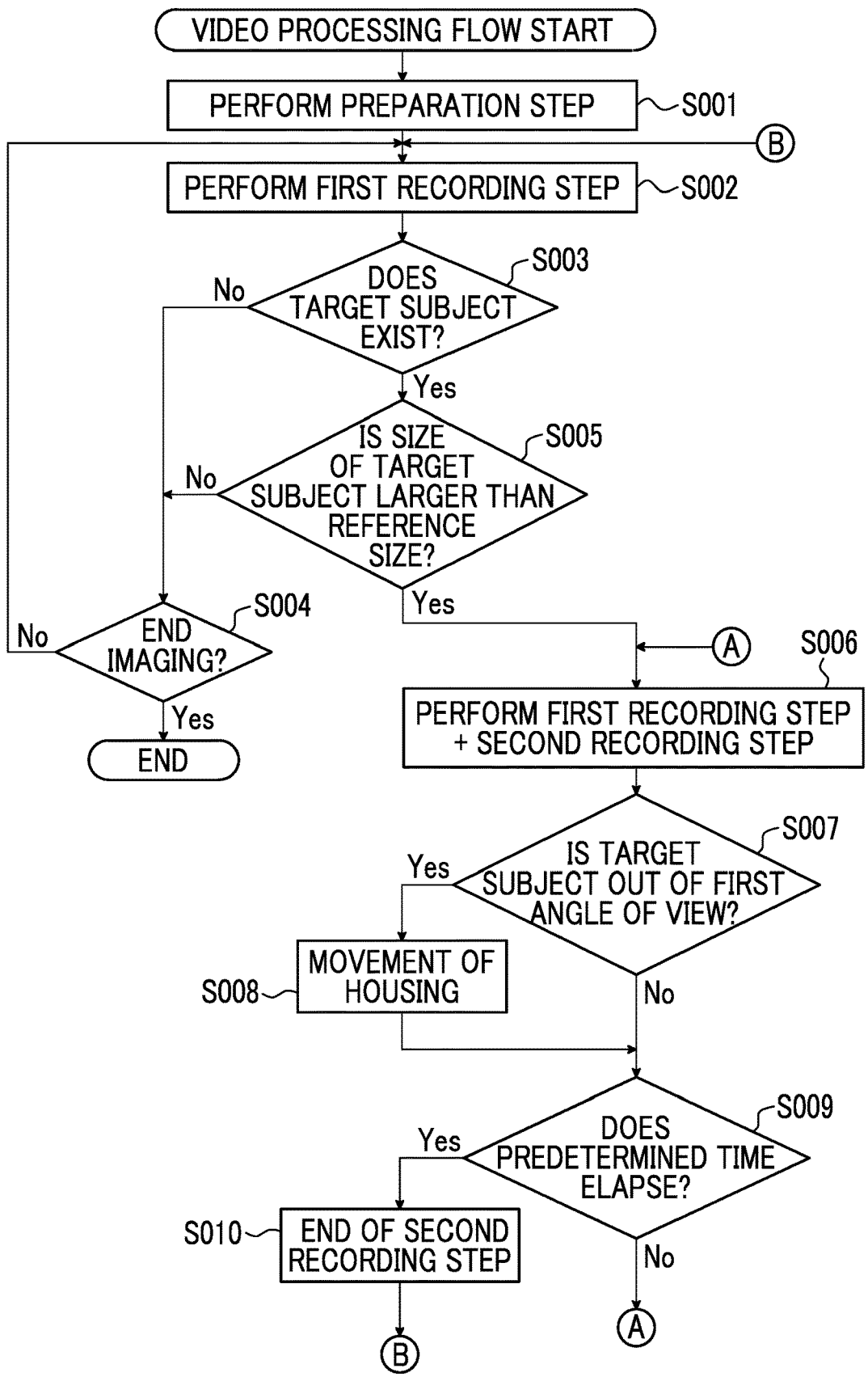
FIG. 9 is a diagram showing a processing flow of creating a video by a video creation method according to an embodiment of the present invention.

The video creation flow proceeds according to a flow shown in FIG. 9. The video creation flow starts from a preparation step (S001) for preparing the imaging device 10. In the preparation step, the surveillance camera, which is the imaging device 10, is prepared, and the surveillance camera is installed at a predetermined position in a state where a front of the camera faces the imaging range. The preparation step is performed only in a first video creation flow and is omitted in second and subsequent video creation flows.

Next, the imaging device 10 performs a first recording step (S002). The first recording step is a step of creating the video of the first angle of view and recording the first video data, and is started, for example, with receiving of an instruction to start the imaging from the monitoring terminal 12 by the imaging device 10 as a trigger. The first angle of view is set before the first recording step is performed, and may be changed by the user as appropriate during the first recording step.

In rough description of the flow of the first recording step, the imaging by the imaging element 40 is repeated for a length of a predetermined unit imaging period, and the pixel signal is read out from the pixel p in the pixel region corresponding to the first angle of view in each piece of imaging (that is, one unit imaging period). In this case, the number of pixel rows L according to the first thinning-out rate is thinned out from the plurality of pixel rows L in the pixel region corresponding to the first angle of view. Accordingly, the video of the first angle of view is created at the first thinning-out rate, and the first video data is recorded in a predetermined recording medium, for example, the recording medium inside the imaging device 10.

Next, the control unit 50 of the imaging device 10 analyzes the video of the first angle of view created in the first recording step to determine whether or not the target subject exists within the first angle of view (S003). In a case where the target subject does not exist within the first angle of view, the processing proceeds to step S004 to determine whether or not there is an instruction to end the imaging. In a case where there is the instruction to end the imaging, the first recording step is completed, and the video creation flow ends at a point in time of the completion.

On the other hand, in a case where the target subject exists within the first angle of view in step S003, the processing proceeds to step S005. In a case where a plurality of target subjects exist within the first angle of view, each step after step S005 is performed for each target subject. However, the invention is not limited thereto. In a case where a large number of target subjects exist within the first angle of view, for example, priority may be set for each target subject, and each step after step S005 may be performed only for a target subject with high priority.

In step S005, the control unit 50 specifies the size of the target subject and determines whether or not the specified size is larger than a reference size. The size of the target subject is a size of the target subject at the first angle of view, and may be, for example, a length (height) of the target subject on the video of the first angle of view. Alternatively, the size of the target subject may be an area occupied by the video of the target subject in the video of the first angle of view, specifically the number of pixel videos t (the number of pixels). The reference size is set in advance as a reference in a case where determination is made whether or not to perform a second recording step, which will be described below, and may be changed as appropriate by the user after the setting.

In a case where the size of the target subject is larger than the reference size (hereinafter referred to as first size), the processing proceeds to step S006, and the second recording step is performed as described below in step S006. On the other hand, In a case where the size of the target subject is smaller than the first size, the processing proceeds to step S004 without performing the second recording step. This is because the target subject smaller than the first size is detected with low accuracy as the target subject, and the appearance and the like of the target subject are difficult to be recognized from the video even in a case where the second video data is recorded.

In the present embodiment, the second recording step is performed for the target subject that is larger than the first size, but the present invention is not limited thereto. The second recording step may be performed only in a case where the size of the target subject is smaller than the reference size (hereinafter referred to as second size). In this case, for a target subject smaller than the second size, a high resolution video of the second angle of view is created. For a target subject larger than the second size, the video of the second angle of view is not created, and only a low resolution video of the first angle of view is created. This is because it is possible to sufficiently confirm the appearance and the like of the subject even with the low resolution video of the first angle of view in a case where the subject is larger than the second size.

The determination step S005 relating to the size of the target subject does not necessarily need to be performed and may be omitted.

In step S006, the imaging device 10 performs the first recording step and the second recording step. The second recording step is a step of creating the video of the second angle of view including the target subject and recording the second video data, and the flow thereof is generally the same as the flow of the first recording step.

That is, during a period in which the imaging by the imaging element 40 is repeated for a length of a predetermined unit imaging period, the number of thinning-out pixel rows Lx according to the second thinning-out rate is thinned out from the pixel region corresponding to the second angle of view in each imaging (that is, in one imaging unit period). On the other hand, the pixel signal is read out from each pixel p in the non-thinning-out pixel row Ly, the video of the second angle of view is created from the read pixel signal, and the second video data is recorded. Since the second thinning-out rate is smaller than the first thinning-out rate, the video of the second angle of view has a higher resolution than the video of the first angle of view.

Some of the plurality of pixel rows L in the pixel array 41 may correspond to the non-thinning-out pixel rows Ly from which the pixel signals are read out in both the first recording step and the second recording step. In other words, some of the pixels p that output the pixel signals used in the first recording step may be shared with some of the pixels p that output the pixel signals used in the second recording step. In this case, in a case where the video of the second angle of view is created, some of the pixel signals used to create the video of the first angle of view can be used. Therefore, it is possible to more easily create the video of the second angle of view, that is, a high resolution video.

In a case where determination is made in step S005 that the plurality of target subjects exist within the first angle of view, the second recording step may be performed for each target subject for the plurality of target subjects in step S006. Accordingly, it is possible to create the video of the second angle of view, that is, a high resolution video for each target subject. In this case, the second recording step for each target subject is preferably performed in the same unit imaging period. Further, a condition in a case where the video of the second angle of view is created may be changed for each target subject, and for example, the second thinning-out rate may be changed for each target subject.

In the following, for the purpose of simplifying the description, the description will be made assuming that a single target subject exists within the first angle of view.

Figure 10:
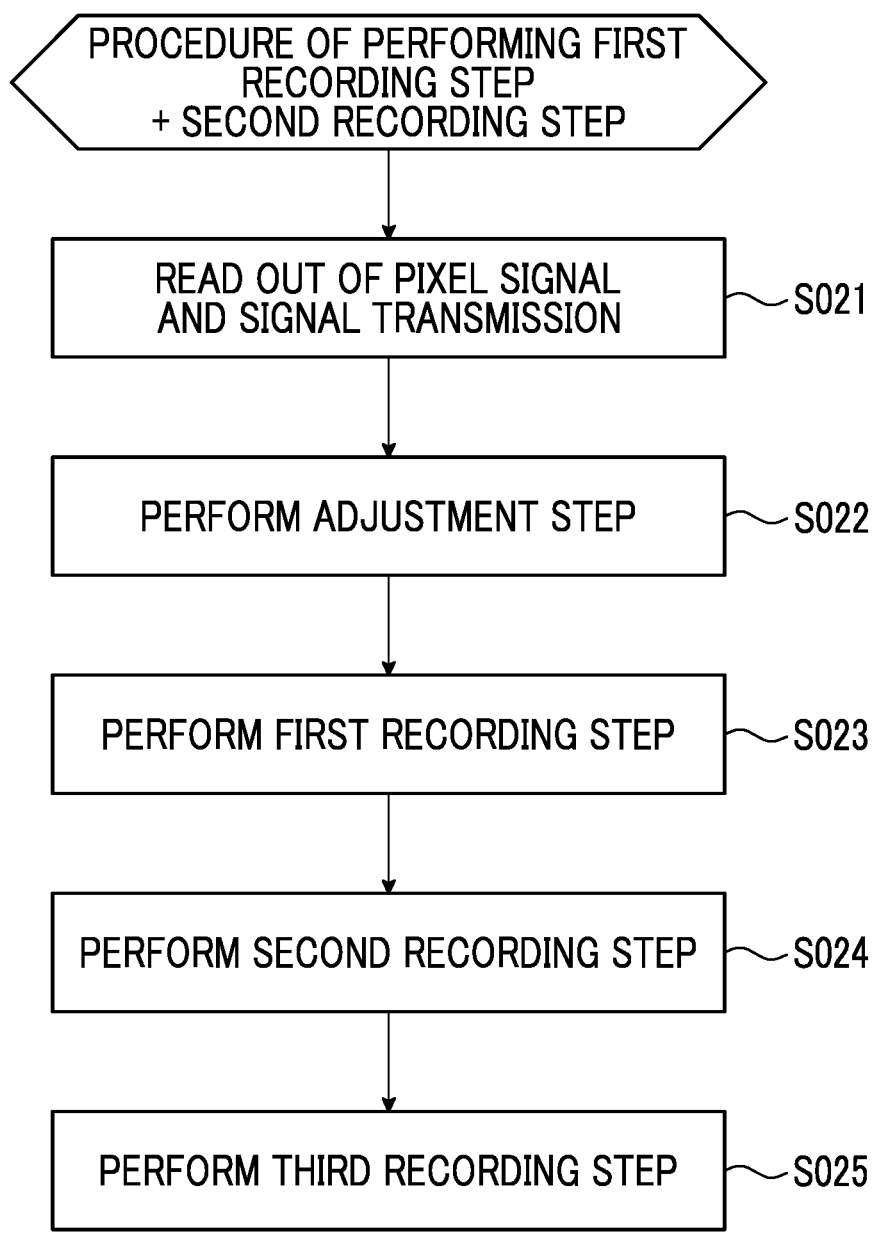
FIG. 10 is a diagram showing a flow of step S006 in FIG. 9.

In step S006 in which the first recording step and the second recording step are performed, first, the pixel signals used in each of the first recording step and the second recording step are read out and transmitted to the control unit 50 in the pixel array 41, as shown in FIG. 10 (S021). In this case, the pixel signals used in the first recording step and the pixel signals used in the second recording step are read out, for example, during the same unit imaging period. The pixel signals for one unit imaging period are transmitted according to any one of two patterns described below.

Figure 11:
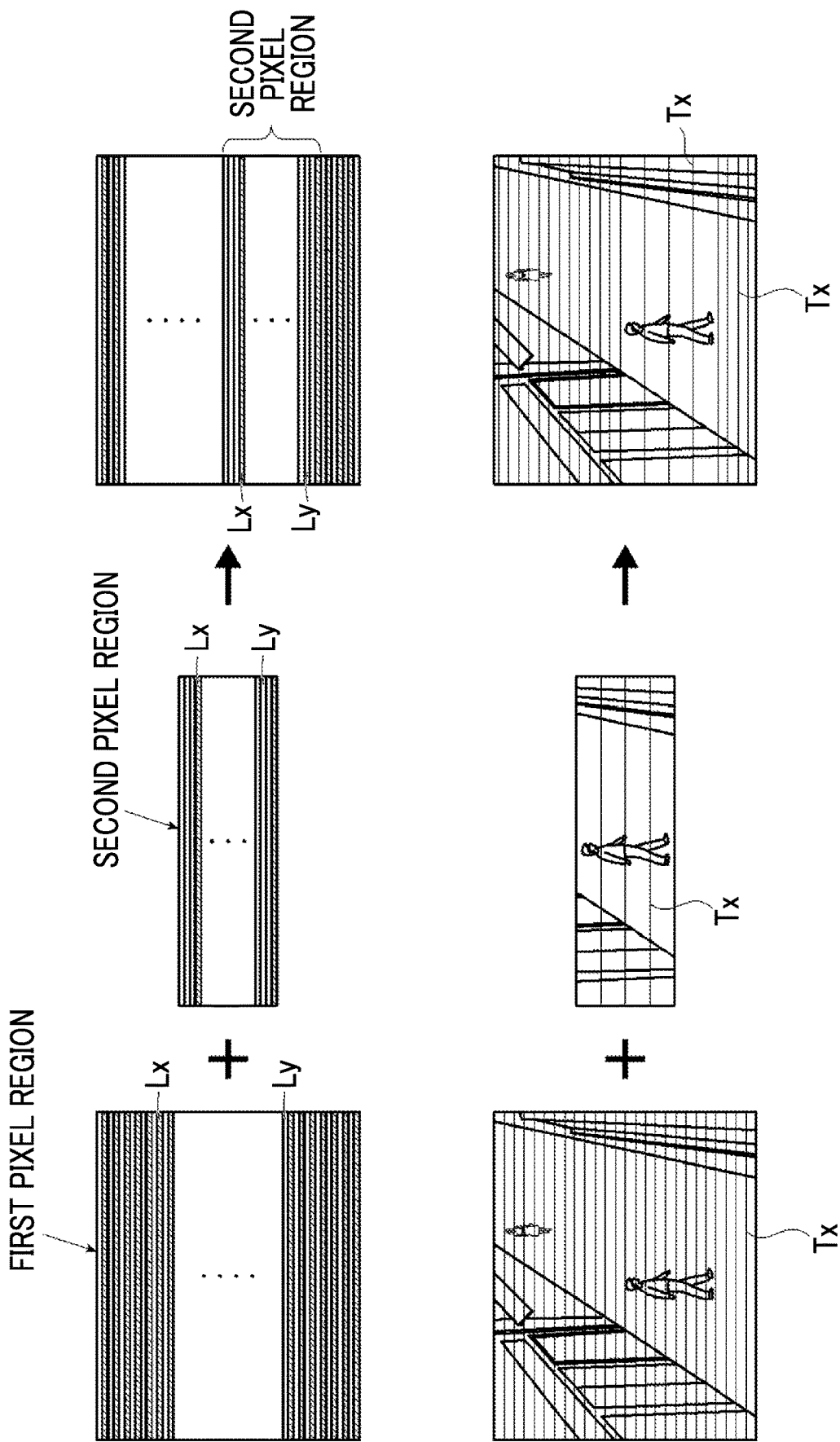
FIG. 11 is an explanatory diagram of a readout pattern of pixel signals.

In one pattern (hereinafter referred to as first readout pattern), the pixel signals used in the first recording step and the pixel signals used in the second recording step are simultaneously read out from the pixels p in the imaging element 40 for one unit imaging period. The readout pixel signal is transmitted to the control unit 50. The first readout pattern will be described in detail with reference to FIG. 11. FIG. 11 is an explanatory diagram of the first readout pattern. An upper diagram in FIG. 11 shows the pixel region corresponding to the set angle of view, and the thinning-out pixel row Lx is hatched. A lower diagram in FIG. 11 shows the video of the set angle of view, and the video line corresponding to the pixel row L to be thinned out (that is, thinning-out video line group Tx) is represented by a black line.

In the first readout pattern, the pixel signals are collectively read out at one time from all pixels p in a pixel region corresponding to the first angle of view (hereinafter referred to as first pixel region) for one unit imaging period, and the readout pixel signals are temporarily stored in the memory unit 112 (refer to FIG. 4) of the logic circuit 45. Thereafter, the signal processing unit 111 (refer to FIG. 4) of the logic circuit 45 thins out pixel signals read out from a pixel region (hereinafter referred to as second pixel region) corresponding to the second angle of view among the pixel signals stored in the memory unit 112 at the second thinning-out rate and thins out other pixel signals at the first thinning-out rate.

In the case shown in FIG. 11, the number of pixel rows L according to the second thinning-out rate is thinned out for the second pixel region. Further, the number of pixel rows L according to the first thinning-out rate is thinned out for a region other than the second pixel region in the first pixel region. As can be seen from FIG. 11, in the second pixel region, an interval between the thinning-out pixel rows Lx is wider than in the region other than the second pixel region. This reflects that the second thinning-out rate is smaller than the first thinning-out rate.

In FIG. 11, in each of the second pixel region and the region other than the second pixel region, pixel signals of rows that are not thinned out (non-thinning-out pixel rows Ly) are read out from the pixels p in the imaging element 40. In this case, the pixel signals of the non-thinning-out pixel rows Ly in each region may be collectively transmitted from the imaging element 40 to the control unit 50 as shown in the right diagram of FIG. 11. In this case, the pixel signals are divided for each region on the control unit 50 side, and then the pixel signals for each region are used in the first recording step and the second recording step. Alternatively, the pixel signals of each region may be divided for each region at a point in time of transmission and transmitted from the imaging element 40 to the control unit 50 in two stages.

In another pattern (hereinafter referred to as second readout pattern), the pixel signals are read out in two stages from the pixels p of the imaging element 40 for one unit imaging period. Specifically, in one unit imaging period, the pixel signals used in the first recording step are first read out and accumulated in the memory unit 112. Thereafter, in the same unit imaging period, untransmitted signals thinned out in the first recording step, among the pixel signals used in the second recording step, are read out and accumulated in the memory unit 112. Each of the pixel signals used in the first recording step and the pixel signals used in the second recording step is transmitted from the memory unit 112 to the control unit 50. In creating the video of the first angle of view in the second readout pattern in this manner, the pixel signals are thinned and read out in the first pixel region, and then pixel signals as necessary to create the second angle of view from among the thinned-out pixel signals are additionally read out.

In the first readout pattern, it is possible to suppress a difference in a readout timing between the pixel signals used in the first recording step and the pixel signals used in the second recording step. Therefore, in a case where the first readout pattern is adopted, there is an advantage that so-called rolling shutter distortion is less likely to occur in the video of the first angle of view.

In the first readout pattern or the second readout pattern described above, the pixel signals used in the first recording step and the pixel signals used in the second recording step are read out within the same unit imaging period and transmitted to the control unit 50. In this case, the first recording step and the second recording step are performed using the pixel signals output from the pixels p within the same unit imaging period.

On the other hand, the readout pattern is not limited to the above. The pixel signals used in the first recording step and the pixel signals used in the second recording step may be read out in different unit imaging periods. In this case, the first recording step and the second recording step are performed in different unit imaging periods.

Returning to FIG. 10, after the transmission of the pixel signal, the control unit 50 performs as appropriate an adjustment step of adjusting the focal position using the pixel signal received from the phase difference pixel (S022). With the adjustment step, the first recording step and the second recording step can be performed in a state where the focal position is in focus on the target subject (S023, S024).

In the case where the pixel signals used in the first recording step and the pixel signals used in the second recording step are read out in different unit imaging periods, the adjustment step can be performed in a more suitable aspect. Specifically, in the above case, the first recording step and the second recording step are performed in different unit imaging periods, as described above. In this case, the adjustment step may be performed by using pixel signals output from the plurality of phase difference pixels in a unit imaging period in which one of the first recording step and the second recording step is performed. Accordingly, it is possible to use the pixel signals of different phase difference pixels between the unit imaging period in which the first recording step is performed and the unit imaging period in which the second recording step is performed. For example, in the unit imaging period in which the first recording step is performed, the adjustment step can be performed by using some of the pixel signals read out in a unit imaging period different from the unit imaging period, that is, in the unit imaging period in which the second recording step is performed as the pixel signal of the phase difference pixel.

In the above case, the plurality of phase difference pixels may include a plurality of first phase difference pixels and a plurality of second phase difference pixels. The first phase difference pixel is a pixel p that outputs the pixel signal in the unit imaging period in which the first recording step is performed, and the second phase difference pixel is a pixel p that outputs the pixel signal in the unit imaging period in which the second recording step is performed. In this case, in the adjustment step, the focal position is preferably adjusted based on phase difference information according to the signals output from the plurality of first phase difference pixels and phase difference information according to the signals output from the plurality of second phase difference pixels. With the use of the pixel signals of the phase difference pixels output in each of the unit imaging period in which the first recording step is performed and the unit imaging period in which the second recording step is performed in this manner, it is possible to more precisely adjust the focal position in the adjustment step.

The adjustment step may be performed in an aspect different from the above aspect. For example, the pixel signal of the phase difference pixel may be read out only in the unit imaging period in which the first recording step is performed and may not be read out in the unit imaging period in which the second recording step is performed. In this case, all the pixel signals read out in the unit imaging period during which the second recording step is performed are used to create the video of the second angle of view, and are not used as the pixel signals of the phase difference pixels. Therefore, the image quality of the video of the second angle of view is maintained at a high level.

On the other hand, in the first recording step, since the pixel signals thinned out at the first thinning-out rate are used, the number of pixel signals used for video creation is small. Therefore, in a case where a part of the pixel signals is used as the pixel signals of the phase difference pixels, the correction by the phase difference pixels may not be performed appropriately. In consideration of this point, the pixel signals of the phase difference pixels may be read out only in the unit imaging period in which the second recording step is performed, and the pixel signals of the phase difference pixels may not be read out in the unit imaging period in which the first recording step is performed.

In a case where the second recording step is performed, as shown in FIG. 10, the imaging device 10 performs a third recording step in which information data for associating the second video data with the first video data is recorded, together with the first recording step and the second recording step (S025). With the third recording step, it is possible to grasp a relationship between the video of the first angle of view and the video of the second angle of view in a case where the video of the second angle of view is reproduced from the second video data.

Examples of the information for associating the second video data with the first video data include information indicating when the video of the second angle of view is captured and information for specifying a relative position of the second angle of view with respect to the first angle of view. The above information also may include information as to which unit imaging period counted from at a point in time of reference during the first recording step corresponds to the unit imaging period in which the second recording step is performed.

The above information data is preferably recorded in association with the first video data, and may be recorded in any one of the imaging device 10 or the monitoring terminal 12.

In a case where the second recording step is performed, the first video data in which identifier display data is incorporated is recorded in the first recording step performed together with the second recording step. The identifier display data is data for displaying an identifier u on the video of the first angle of view in a superimposed manner as shown in FIG. 12 in a case where the video of the first angle of view is reproduced from the first video data. The identifier u represents a position of the video of the second angle of view in which the second video data is recorded in the video of the first angle of view. For example, the identifier u is a frame surrounding the second angle of view as shown in FIG. 12. With this identifier u, in a case where the video of the first angle of view is displayed, it is possible to easily specify the target subject for which the second video data is recorded in the video of the first angle of view.

The identifier u may be other than the frame shown in FIG. 12, and may be an indicator such as an arrow or a pointer pointing to the position of the second angle of view. In order to emphasize the position of the second angle of view in the first angle of view, a range corresponding to the second angle of view in the video of the first angle of view may be highlighted. The identifier display data can be generated by, for example, specifying the position of the second angle of view using the data recorded in the third recording step described above, that is, the information data for associating the second video data with the first video data.

Returning to the description of the video creation flow, the control unit 50 monitors the video of the first angle of view during the second recording step to determine whether the target subject within the first angle of view in which the second video data is recorded is moved out of the first angle of view or to an edge portion of the first angle of view (S007). In a case where the target subject is moved out of the first angle of view or near the edge portion of the first angle of view, the control unit 50 controls the three-axis movement mechanism 24 to move the housing 22 for moving the target subject within the first angle of view again (S008). Accordingly, it is possible to track the target subject outside the first angle of view and to continue the recording of the second video data for the target subject.

Even in a case where the target subject moves out of the first angle of view during the second recording step, it is not necessary to move the housing 22 in order to track the target subject. For example, in a case where the plurality of target subjects exist within the first angle of view and the second recording step is performed for each of the target subjects, even in a case where one target subject moves out of the first angle of view, the housing 22 may be maintained at the position of the first angle of view without being moved.

In a case where the second recording step is performed, the control unit 50 ends the second recording step at a point in time at which a defined time elapses from the start of the second recording step (S009, S010). As described above, in the present embodiment, in a case where the target subject exists within the first angle of view, the second recording step is performed in order to acquire a high resolution video of the target subject, and the second recording step is stopped at a point in time at which the second video data for a predetermined time is stored. Accordingly, it is possible to avoid a situation in which the high resolution video data of the target subject, that is, the second video data is recorded more than necessary. Such an effect is particularly significant in a case where each passerby is set as the target subject on a road or the like where many people come and go and the second video data is recorded for each target subject.

The defined time is set in advance as a time required for the second recording step, but may be changed by the user after setting. The defined time may be set to any time, for example, from one minute to several minutes.

The second recording step may be performed again on the same target subject after the second recording step is interrupted after the defined time elapses from at a point in time of the start of the second recording step. For example, in a case where the target subject recorded in the interrupted second video data continues to exist within the first angle of view, the second recording step may be restarted. In a case where the target subject repeatedly enters and exits the angle of view, which is the imaging range, the second recording step for the target subject may be restarted.

Other Embodiments

The embodiments described so far are specific examples given to describe the video creation method of the present invention in an easily understandable manner and are merely examples, and other embodiments are also conceivable.

In the above embodiment, various pieces of data processing in the video creation flow are executed by the control unit 50 of the imaging device 10, but the present invention is not limited thereto. For example, some or all of the data processing in the video creation flow may be performed by the processor of the monitoring terminal 12, or may be performed by cooperation between the control unit 50 of the imaging device 10 and the processor of the monitoring terminal 12.

In the above embodiment, the moving image is created as the video and the video data is recorded, but the video may be a still image. For example, the video of the first angle of view may be recorded as moving image data and the video of the second angle of view may be recorded as still image data, or the video of the first angle of view may be recorded as still image data and the video of the second angle of view may be recorded as moving image data.

In the above embodiment, the case where the imaging device 10 is the surveillance camera has been described as an example, but it is also possible to realize the video creation method of the present invention using an imaging device other than the surveillance camera. Examples of the imaging device other than the surveillance camera include a digital camera, a mobile phone with an imaging optical system, a smartphone, a laptop computer, and a tablet terminal.

EXPLANATION OF REFERENCES

10: imaging device
10S: imaging system
12: monitoring terminal
14: monitor
16: network
20: imaging device main body
20a: main body cover
22: housing
24: three-axis movement mechanism
26: optical unit
27, 28: optical apparatus
30: stop
34: driving unit for zooming
36: driving unit for focusing
38: stop driving unit
40: imaging element
41: pixel array
42: pixel driving line
43: vertical signal line
44: control circuit
45: logic circuit
50: control unit
52: controller
54: video processing unit
62: analog signal processing circuit
64: internal memory
66: card slot
67: memory card
68: interface for communication
70: buffer memory
C: pixel column
L: pixel row
Lx: thinning-out pixel row
Ly: non-thinning-out pixel row
p: pixel
t: pixel video
Tx: thinning-out video line group
Ty: non-thinning-out video line group
u: identifier

What is claimed is:
1. An imaging device comprising:
an image sensor configured to output pixels signals corresponding to a plurality of pixels;
a control circuit configured to:
read out the pixel signals from the plurality of pixels as a first recording function,
create a video of a first angle of view at a first thinning-out rate, and recording first video data;
perform a detection of a target subject from the video of the first angle of view; and
in a case where a target subject exists within the first angle of view, create a video including the target subject and having a second angle of view smaller than the first angle of view at a second thinning-out rate lower than the first thinning-out rate and recording second video data as a second recording function, wherein imaging by the image sensor is repeatedly performed for each unit imaging period, the first recording function and the second recording function are configured to be performed in the unit imaging periods different from each other, and in the unit imaging period in which the second recording function is performed, the pixel signals are output from a plurality of phase difference pixels included in the plurality of pixels, and adjust a focal position during imaging based on phase difference information according to the pixel signals output from the plurality of phase difference pixels, wherein the video having the second angle of view has a higher resolution than the video having the first angle of view.

2. The imaging device according to claim 1, wherein the control circuit is further configured to record data of information for associating the second video data with the first video data in a case where the second recording step is performed as a third record function.

3. The imaging device according to claim 2, wherein in the imaging element, the plurality of pixels are arranged in a first arrangement direction and a second arrangement direction intersecting with each other, and a plurality of pixel rows are arranged in the first arrangement direction, the pixel signals are read out in units of the pixel row, a video is configured of a plurality of pixel videos arranged in a first direction corresponding to the first arrangement direction and a second direction corresponding to the second arrangement direction, and the second thinning-out rate in the first direction is smaller than the first thinning-out rate in the first direction.

4. The imaging device according to claim 2, wherein some of the pixels outputting the pixel signals in the first recording function are pixels common to some of the pixels outputting the pixel signals used in the second recording step.

5. The imaging device according to claim 1, wherein in the imaging element, the plurality of pixels are arranged in a first arrangement direction and a second arrangement direction intersecting with each other, and a plurality of pixel rows are arranged in the first arrangement direction, the pixel signals are read out in units of the pixel row, a video is configured of a plurality of pixel videos arranged in a first direction corresponding to the first arrangement direction and a second direction corresponding to the second arrangement direction, and the second thinning-out rate in the first direction is smaller than the first thinning-out rate in the first direction.

6. The imaging device according to claim 5, wherein some of the pixels outputting the pixel signals in the first recording function are pixels common to some of the pixels outputting the pixel signals used in the second recording function.

7. The imaging device according to claim 1, wherein some of the pixels outputting the pixel signals in the first recording function are pixels common to some of the pixels outputting the pixel signals used in the second recording function.

8. The imaging device according to claim 7, wherein the first recording function and the second recording function are performed by using the pixel signals output from pixels in the same unit imaging period.

9. The imaging device according to claim 1, wherein in a case where a plurality of target subjects exists within the first angle of view, the second recording function is performed on the plurality of target subjects.

10. The imaging device according to claim 1, wherein, in the unit imaging period in which the first recording function is performed, the pixel signals are not output from the plurality of phase difference pixels.

11. The imaging device according to claim 1, wherein in a case where the target subject exists within the first angle of view and a size of the target subject is larger than a reference size, the second recording function is performed.

12. The imaging device according to claim 1, wherein in a case where the target subject exists within the first angle of view and a size of the target subject is smaller than a reference size, the second recording function is performed.

13. The imaging device according to claim 1, wherein the second recording function ends at a point in time at which a defined time elapses from a start of the second recording function.

14. The imaging device according to claim 1, wherein in a case where a target subject within the first angle of view moves out of the first angle of view during the second recording function, a housing that accommodates the imaging element is moved to fit the target subject within the first angle of view again.

15. The imaging device according to claim 1, wherein in a case where the second recording function is performed, the first video data in which identifier display data is incorporated is recorded in the first recording function, and the identifier display data is data for displaying, on the video of the first angle of view, an identifier representing a position of the video of the second angle of view in which the second video data is recorded.

16. The imaging device according to claim 1, wherein the number of pixels outputting the pixel signals used for video creation decreases as the thinning-out rate is higher.

17. A video creation method for use in an imaging device that reads out pixel signals from a plurality of pixels in an imaging element to create any video using the pixel signals, the video creation method comprising:

a first recording step of reading out the pixel signals from the plurality of pixels, creating a video of a first angle of view at a first thinning-out rate, and recording first video data;

a second recording step of creating a video including the target subject and having a second angle of view smaller than the first angle of view at a second thinning-out rate and recording second video data; and a step of performing a detection of a target subject from the video of the first angle of view; and wherein as some of a plurality of target subjects within the first angle of view moves out of the first angle of view during the second recording step, a housing that accommodates the imaging element is not moved to fit the some of the plurality of target subjects within the first angle of view again, wherein the video having the second angle of view has a higher resolution than the video having the first angle of view.

18. The video creation method according to claim 17, wherein the plurality of target subjects exists within the first angle of view, and the second recording step is performed on the plurality of target subjects.

19. The video creation method according to claim 17, wherein only one target subject exists within the first angle of view and the target subject moves out of the first angle of view during the second recording step, and the housing that accommodates the imaging element is moved to fit the target subject within the first angle of view again.

20. The video creation method according to claim 17, wherein the second thinning-out rate is lower than the first thinning-out rate.

* * * * *